(12) United States Patent
Lee

(10) Patent No.: US 10,948,707 B2
(45) Date of Patent: Mar. 16, 2021

(54) LIQUID IMMERSION MICROSCOPE OBJECTIVE ASSEMBLY AND RELATED SYSTEMS AND METHODS

(71) Applicant: Molecular Devices, LLC, San Jose, CA (US)

(72) Inventor: Lawrence Lee, Sunnyvale, CA (US)

(73) Assignee: Molecular Devices, LLC, San Jose, CA (US)

( * ) Notice: Subject to any disclaimer, the term of this patent is extended or adjusted under 35 U.S.C. 154(b) by 120 days.

(21) Appl. No.: 16/268,447

(22) Filed: Feb. 5, 2019

(65) Prior Publication Data

US 2020/0249456 A1 Aug. 6, 2020

(51) Int. Cl.
 *G02B 21/02* (2006.01)
 *G02B 21/33* (2006.01)
 *G02B 21/24* (2006.01)

(52) U.S. Cl.
 CPC .......... *G02B 21/33* (2013.01); *G02B 21/02* (2013.01); *G02B 21/24* (2013.01)

(58) Field of Classification Search
 CPC .............................. G02B 21/02; G02B 21/33
 See application file for complete search history.

(56) References Cited

U.S. PATENT DOCUMENTS

| | | | |
|---|---|---|---|
| 7,304,793 B2 | 12/2007 | Hummel | |
| 7,961,384 B2 | 6/2011 | Pirsch | |
| 8,199,407 B2 | 6/2012 | Liebel et al. | |
| 8,465,708 B2 | 6/2013 | Harada et al. | |
| 2007/0047093 A1 | 3/2007 | Hoering et al. | |
| 2010/0027109 A1* | 2/2010 | Liebel | G02B 27/0006 359/381 |
| 2017/0336615 A1* | 11/2017 | Nakamura | G02B 21/02 |
| 2019/0227294 A1* | 7/2019 | Shimada | G02B 21/33 |

\* cited by examiner

*Primary Examiner* — Darryl J Collins
(74) *Attorney, Agent, or Firm* — Olive Law Group PLLC; Ronald A. Rudder

(57) ABSTRACT

A liquid immersion microscope objective assembly includes an objective, a liquid delivery system for delivering an immersion liquid to a lens of the objective, and a liquid return system for removing liquid from an area around the lens. The objective may be positioned below a sample container. Liquid is delivered to the lens so as to form a bolus between the lens and the sample container. Excess liquid drains into the return system, which may be done via a notch or a V-shaped channel. Additionally, the direction of flow through the delivery system may be reversed, such that liquid may also be removed from the area around the lens via the delivery system. The assembly may also be utilized to remove liquid from the underside of the sample container. The assembly may also include a leak sensor and/or an electrowetting device.

22 Claims, 11 Drawing Sheets

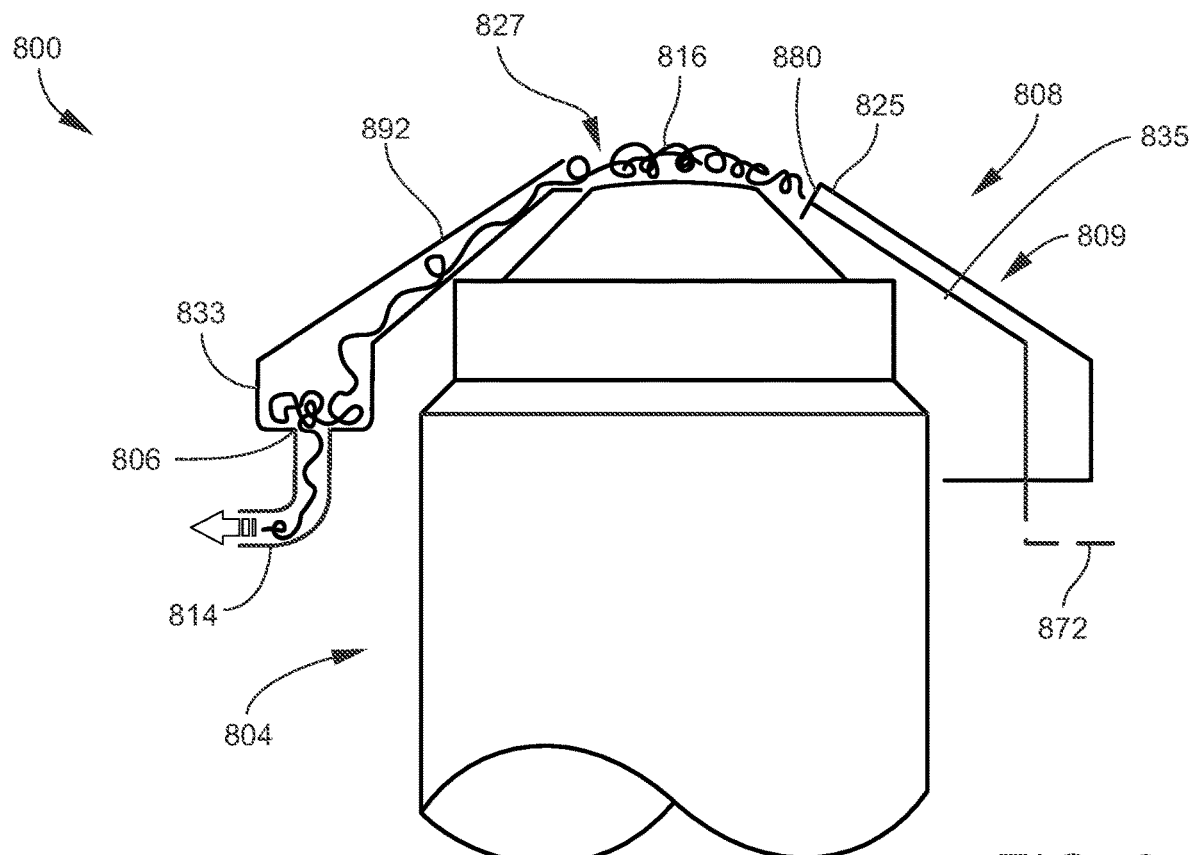
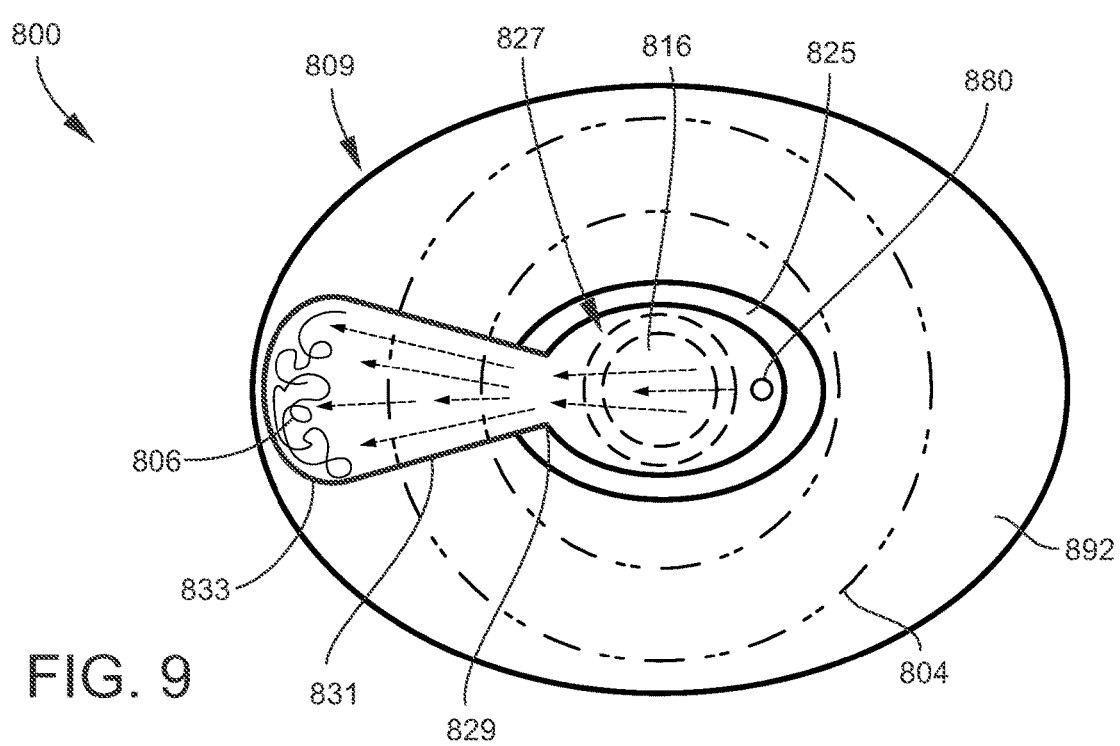

LIQUID IMMERSION MICROSCOPE OBJECTIVE ASSEMBLY AND RELATED SYSTEMS AND METHODS

TECHNICAL FIELD

The present invention relates to liquid immersion microscope objectives, particularly for use with automated microscopes.

BACKGROUND

Microscopy generally refers to a class of analytical techniques for acquiring magnified images of samples, which may be biological or non-biological materials. Light-based (optical) microscopic techniques include bright-field microscopy, dark-field microscopy, confocal microscopy, selective plane illumination microscopy (SPIM), and more recently light-field microscopy. A typical light-based microscope includes a sample stage on which the sample to be imaged is mounted, a light source for producing light for irradiating the sample, optics for directing the light as a beam to the sample and thereby irradiating the sample, an eyepiece and/or camera for capturing an image of the sample, and optics for directing the light emitted from the irradiated sample to the eyepiece and/or camera.

The microscope optics include an objective. The objective is typically a cylindrical structure enclosing one or more lenses, including a lens positioned at the end (or tip) of the objective nearest to the sample. A primary function of the objective is to collect the light emitted from the sample and focus the light to produce a magnified (e.g., 4×, 10×, 100×, etc.) image that can be observed through the eyepiece and/or captured by the camera. In some microscopes, the irradiating light from the light source may also pass through the objective to the sample. In such microscopes, the objective is positioned below the sample, which may be referred to as an epifluorescence configuration.

In use, the lens at the objective tip is positioned at a small distance from the sample. The gap between the objective lens and the sample may be an open space—that is, the gap may be an air gap. In such configuration, significant differences exist in the refractive indices of the various media along the optical path between the objective and the sample. In particular, the lens, the air gap, and the sample differ in refractive index. In the case of a below-positioned or inverted objective (such as in an epifluorescence configuration), the refractive index of the sample support on which the sample is mounted (e.g., glass slide) or in which the sample is contained (e.g., microplate) must also be considered. Consequently, the sensitivity, resolution, and image quality achieved by the microscope may be less than desirable. For example, some of the light from the sample will pass through the air gap without being collected by the objective, and thus does not contribute to the imaging signal, due to excessive refraction at the air-solid interfaces.

To address this problem, a microscope may utilize a "liquid immersion" objective (or liquid immersion lens). This type of objective is configured to immerse the lens at the objective tip in a liquid immersion medium (e.g., water or oil), which fills the gap between the lens and the sample support. The sample may also be immersed in the immersion medium. The immersion medium serves as an index-matching material. That is, as compared to air, the liquid immersion medium has a higher refractive index that is more closely matched to the refractive indices of the lens, the sample support, and the sample. Hence, the use of a liquid immersion objective can improve sensitivity, resolution, and image quality, including at high magnifications, at least in part by effectively increasing the numerical aperture (NA) of the objective lens.

However, in comparison to an air immersion objective, a liquid immersion objective conventionally requires more manual interaction to ensure it functions well and in the intended manner in the microscope. In particular, a significant degree of manual interaction has been required for the successful operation of a liquid immersion objective and the use and handling of the immersion medium. Due to its added complexities and manual requirements, a liquid immersion objective traditionally has not been deployed in an automated microscope or high-content screening system. In automated or high-throughput operating environments, the workflow for a manually operated liquid immersion objective would traditionally fail. For example, as the speed requirements for operation are increased, the manual labor required would take too long and/or would have too high a rework/failure rate to be acceptable.

Therefore, it would be desirable to provide an improved liquid immersion microscope objective, particularly one suitable for use with automated or high-content/high-throughput microscopes.

SUMMARY

To address the foregoing problems, in whole or in part, and/or other problems that may have been observed by persons skilled in the art, the present disclosure provides methods, processes, systems, apparatus, instruments, and/or devices, as described by way of example in implementations set forth below.

According to an embodiment, an objective assembly includes: an objective comprising a housing and a lens mounted at the housing, the lens comprising an outer lens surface; and a liquid handling device mounted at the objective and configured to immerse the outer lens surface in a liquid, the liquid handling device comprising: a rim surrounding the outer lens surface and defining a device opening through which the lens is exposed, the rim comprising a notch; a conical portion comprising a conical surface communicating with the notch; a delivery outlet communicating with the device opening; and a return inlet communicating with the conical surface, wherein: the liquid handling device defines a liquid delivery path from the delivery outlet to the device opening; and the liquid handling device defines a liquid return path from the device opening, through the notch, along the conical surface, and to the return inlet.

According to another embodiment, a method for immersing a lens of a microscope objective with a liquid includes: positioning the microscope objective below a sample support such that the lens and the sample support are separated by a gap, wherein the lens is surrounded by a rim defining an opening through which the lens is exposed, and the rim comprises a notch; flowing liquid to the lens to form and maintain a liquid bolus in the gap and in contact with the lens and the sample support; and while maintaining the liquid bolus, removing liquid by flowing liquid from the lens, into the notch, and along a conical surface positioned above the microscope objective.

According to another embodiment, a liquid immersion microscope objective assembly includes: an objective comprising a housing and a lens mounted at the housing, the lens comprising an outer lens surface; and a liquid handling device mounted at the objective and configured to immerse the outer lens surface in a liquid, the liquid handling device comprising: a rim surrounding the outer lens surface and defining a device opening through which the lens is exposed; a conical portion comprising a conical surface; a delivery outlet communicating with the device opening; a return inlet communicating with the conical surface; and an annular V-shaped channel communicating with the return inlet, wherein: the liquid handling device defines a liquid delivery path from the delivery outlet to the device opening; and the liquid handling device defines a liquid return path from the device opening, along the conical surface, through the annular V-shaped channel, and to the return inlet.

According to another embodiment, a liquid immersion microscope objective assembly includes: an objective comprising a housing and a lens mounted at the housing, the lens comprising an outer lens surface; and a liquid handling device mounted at the objective and configured to immerse the outer lens surface in a liquid, the liquid handling device comprising: a liquid delivery system comprising a delivery inlet, a delivery passage, and a delivery outlet in open communication with the lens, wherein the liquid delivery system defines a liquid delivery path from the delivery inlet, through the delivery passage, through the delivery outlet, and to the lens; and a liquid return system comprising an annular channel in open communication with the lens, a return inlet, a return passage, and a return outlet, wherein the annular channel has a V-shaped profile coaxial with the longitudinal axis, and the liquid return system defines a liquid return path from the lens, through the annular channel, through the return inlet, through the return passage, and to the return outlet.

According to another embodiment, a method for immersing a lens of a microscope objective with a liquid includes: positioning the lens below a sample support such that the lens and the sample support are separated by a gap; flowing liquid to the lens to form and maintain a liquid bolus in the gap and in contact with the lens and the sample support; and while maintaining the liquid bolus, flowing liquid from the lens into an annular V-shaped channel surrounding the lens.

According to another embodiment, a liquid immersion microscope objective system includes: a liquid immersion microscope objective assembly according to any of the embodiments disclosed herein; a liquid delivery line communicating with a delivery inlet of the objective assembly; a liquid pump configured to establish a flow of liquid from the liquid delivery line to a liquid delivery path of the objective assembly; and a liquid return line communicating with a return outlet of the objective assembly.

According to another embodiment, the liquid immersion microscope objective system includes a vacuum pump configured to establish a flow of liquid from the liquid return path to the liquid return line.

According to another embodiment, the liquid immersion microscope objective system includes an aspiration line, and a valve communicating with the liquid delivery line and the aspiration line, the valve configured to switch between a first position and a second position, wherein: at the first position, liquid in the liquid delivery line flows through the liquid delivery path to the delivery outlet; and at the second position, liquid outside the liquid handling device flows into the delivery outlet, through the liquid delivery path, through the delivery inlet, and to the aspiration line.

According to another embodiment, the aspiration line communicates with the liquid return line, and at the second position, the liquid from outside the liquid handling device flows through the aspiration line to the liquid return line.

According to another embodiment, the liquid immersion microscope objective system includes a vacuum pump configured to establish a flow of liquid from a liquid return path of the objective assembly to the liquid return line, and a flow of liquid from the liquid delivery path to the aspiration line.

Other devices, apparatuses, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The invention can be better understood by referring to the following figures. The components in the figures are not necessarily to scale, emphasis instead being placed upon illustrating the principles of the invention. In the figures, like reference numerals designate corresponding parts throughout the different views.

FIG. 8 is a schematic, cross-sectional elevation view of a liquid immersion microscope objective assembly according to another embodiment of the present disclosure.

FIG. 9 is a top plan view of the objective assembly illustrated in FIG. 8.

DETAILED DESCRIPTION

Figure 1:
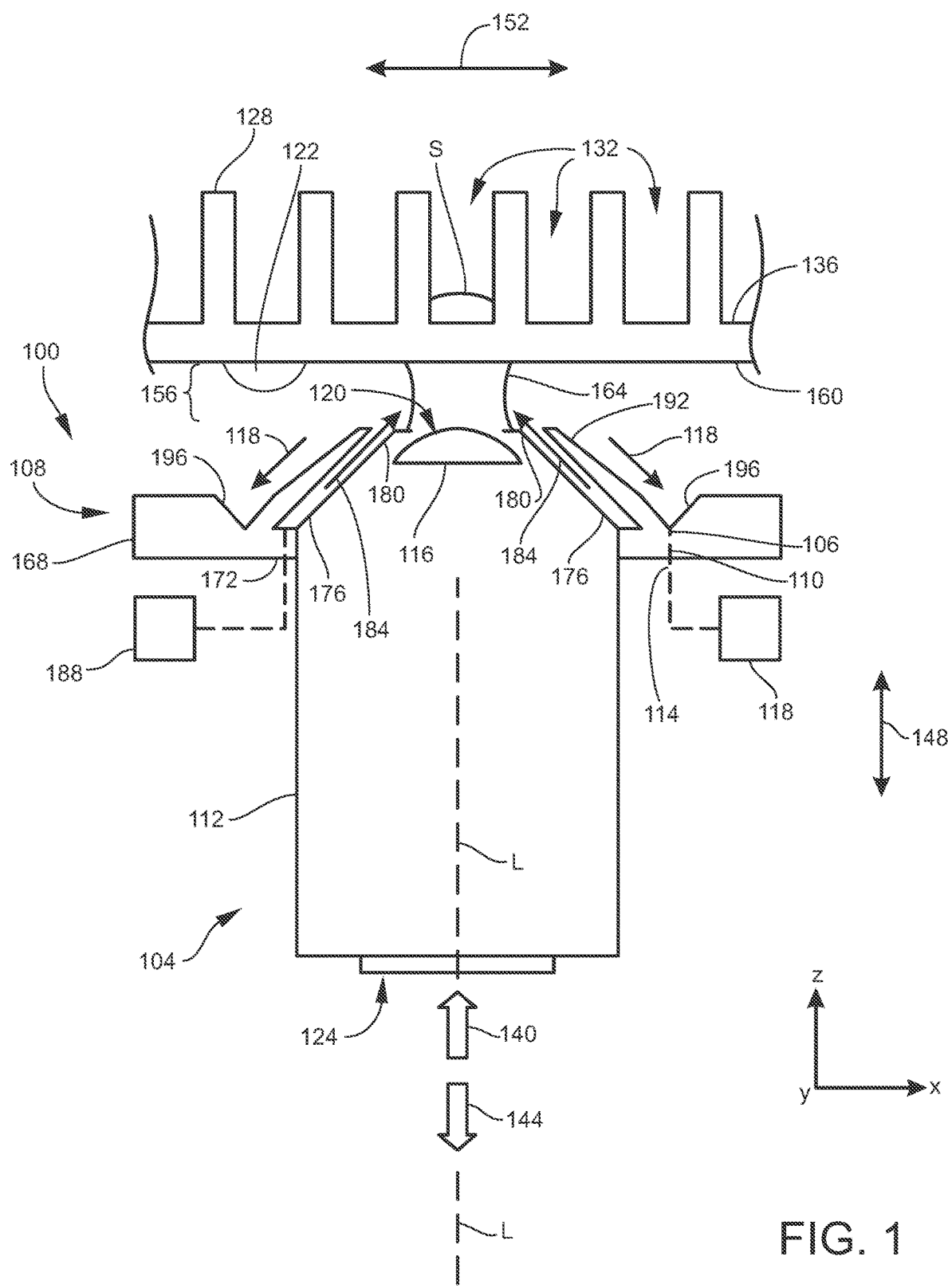
FIG. 1 is a schematic, cross-sectional elevation view of an example of a liquid immersion microscope objective assembly according to an embodiment of the present disclosure.

As used herein, the term "sample" generally refers to one or more objects (or particles) capable of being imaged by a microscope. The sample may be, for example, biological material (e.g., a biological cell, multicellular tissue, single-cell organism, multicellular organism, etc.). Alternatively, the sample may be a non-biological material (e.g., non-biological particulate matter).

For imaging by a microscope, the sample may be supported on or in a sample support at a designated position in relation to optics of the microscope, particularly a microscope objective. The sample is often immersed in a liquid (e.g., a solution) on or in the sample support. The liquid may be composed as needed for carrying out functions related to, for example, sample preparation, sample handling, sample analysis, sample assaying, etc. The liquid may, for example, be or include buffers, preservatives, reagents, labels for imaging, etc.

As used herein, the term "sample support" (or "sample holder") generally refers to any structure utilized in a microscope to support a sample in a fixed position during imaging, although the position may be adjustable or movable if needed. The sample support may be, for example, a solid substrate or plate (e.g., microscope slide, cover slip, etc.) on which the sample is supported, or a sample container in which the sample is supported or held (e.g., well, vial, tube, dish, etc.). The sample support may be optically transparent. In the case of a sample container, at least the bottom thereof may be optically transparent if images are to be captured from below the sample container. A sample container may be cylindrical or polygonal. The bottom of a sample container may be flat or tapered (conical or curved).

Particularly in the case of sample containers, a "sample support" may include a group of such sample containers. Different sample containers may contain different samples, or may contain the same or similar samples but with different solutions, treatments, or chemistries (e.g., different reagents). The multiple sample containers may be arranged as a one-dimensional (linear) or two-dimensional array. In one specific example, multiple sample containers may be provided as wells integrally formed as part of a multi-well plate (also referred to as a microtiter plate or "microplate," or an optical plate). Typically, the microplate wells are arranged in a two-dimensional array having a 2:3 row-to-column ratio. Such a multi-well plate may have a standard format, such as a 24-well, 96-well, or 384-well, or 1536-well format. Alternatively, multiple sample containers may be removable from a container support (e.g., vials removable from a rack).

As used herein, the term "light" generally refers to electromagnetic radiation, quantizable as photons. As it pertains to the present disclosure, light may propagate at wavelengths ranging from ultraviolet (UV) to infrared (IR). In the present disclosure, the term "light" is not intended to be limited to electromagnetic radiation in the visible range. In the present disclosure, the terms "light," "photons," and "radiation" are used interchangeably.

Various embodiments disclosed herein involve acquiring images (or "imaging") of a sample. Depending on the embodiment and/or the sample being imaged, the image acquisition may be based on fluorescence, reflectance (or scattering), or transmittance. Generally, the imaging of a sample involves irradiating the sample with "excitation light," and collecting "emission light" emitted from the sample in response to the irradiation. In fluorescence-based imaging, the wavelength of the excitation light (e.g., in the ultraviolet (UV) range) is usually shorter (e.g., bluer) than the wavelength of the (e.g., redder) emission light. The source of the fluorescence-based emission light may be auto-fluorescence from the object, or fluorescence from a fluorophore previously attached to the object. In reflectance-based imaging, the wavelength of the excitation light may be about the same as the wavelength of the emission light. In this case, the light reflected (or scattered) from the object in response to the incident excitation light is the emission light.

In transmittance-based imaging, the excitation light incident on the object passes through the object and is attenuated due to absorbance and/or scattering. In this case, the attenuated light emanating from the object is the emission light. In all such cases, for convenience, in the present disclosure "excitation light" refers to the light utilized to irradiate the object, and "emission light" refers to the light collected from the sample in response to the irradiation, regardless of whether the particular instance of acquiring an image is based on fluorescence, reflectance, or transmittance, unless specified otherwise or the context dictates otherwise.

As used herein, the term "fluid line" or "liquid line" generally refers to any type of conduit, or a plurality of conduits, utilized to conduct a fluid (e.g., a liquid) in a desired direction from one point to another point in a fluidic system. Thus, a "line" may be or include one or more tubes (or pipes or the like), channels, chambers, etc. A line may also include other types of fluidic components that perform functions in addition to conducting fluid. Other types of fluidic components include, but are not limited to, pumps, valves, fluid fittings, fluid couplings, mixers, fluid stream mergers, heaters, coolers, pressure regulators, etc.), as well as measuring instruments (e.g., temperature sensors, pressure sensors, flow sensors, etc.). A "line" may include any combination of one or more tubes (or the like) and other types of fluidic components.

FIG. 1 is a schematic, cross-sectional elevation view of an example of a liquid immersion microscope objective assembly (or apparatus) 100 according to an embodiment of the present disclosure. For descriptive purposes, FIG. 1 and other drawing figures include a Cartesian (X-Y-Z) frame of reference, the origin of which has been arbitrarily located relative to the objective assembly 100. The Z-axis typically corresponds to the vertical direction. As a structure, the objective assembly 100 may be considered as having a longitudinal axis L along which its length is defined. In the present example, the longitudinal axis L corresponds to (coincides with or is parallel with) the Z-axis.

The objective assembly 100 generally includes an objective 104 and a liquid handling device 108. The objective 104 includes an objective housing 112 and a primary entrant lens 116. The housing 112 extends along the longitudinal axis L from a first (upper) end (or tip of the objective 104) at which a first (upper) housing opening 120 is located to a second (lower) end at which a second (lower) housing opening 124 is located. The lens 116 is mounted in the first housing opening 120 such that an outside surface of the lens 116 faces a region outside the housing 112. The housing 112 is typically cylindrical, with the longitudinal axis L corresponding to the central axis of the objective 104. A portion of the housing 112 is hollow and defines an optical path (generally along the longitudinal axis L) between the first housing opening 120 and the second housing opening 124. In addition to the illustrated lens 116, the objective 104 may include other internal optics (not shown) that define the optical path, such as other lenses, mirrors, etc., as appreciated by persons skilled in the art.

FIG. 1 also illustrates a portion of a sample support that includes or supports a plurality of sample containers. In the illustrated example, the sample support is a microplate 128 and the sample containers are wells 132 of the microplate 128. In use, one or more of the wells 132 contain one or more samples S, respectively, to be imaged by the associated microscope. In the illustrated example, sometimes referred to as an "inverted" configuration, the objective assembly 100 is positioned below the microplate 128. In this case, at least a bottom section 136 of the microplate 128 (or least the portions of the bottom section 136 below the wells 132) is optically transparent to allow the optical path to pass through the bottom section 136 to or from a selected sample S that has been optically aligned with the lens 116. Thus, this configuration enables both irradiation (as depicted by excitation light 140) and imaging (as depicted by emission light 144) of target samples S from below the microplate 128, if desired.

Thus, in the illustrated embodiment, the microscope that includes the illustrated objective 104 has an epifluorescence-type configuration. In this case, the objective 104 receives (via the second housing opening 124) the excitation light 140 at an excitation wavelength from an appropriate light source (e.g., light-emitting diode, laser diode, laser, etc.) via appropriate optics (e.g., excitation filter, dichroic beam splitter, filter cube, lenses, mirrors, light guides, apertures, confocal spinning disk, etc.) and transmits the excitation light 140 to the sample S, thereby irradiating and inducing a fluorescent response in the sample S. The objective 104 also collects the resulting emission light 144 emitted from the sample S at an emission wavelength (which in fluorescent applications is different from the excitation wavelength), whereby the emission light 144 passes through the second housing opening 124 and is transmitted to an appropriate imaging device (e.g., camera) via appropriate optics (e.g., emission filter, dichroic beam splitter, filter cube, lenses, mirrors, light guides, apertures, confocal spinning disk, etc.). Hence, in the present example, the objective 104 both focuses the excitation light 140 onto a focal plane in the thickness of the sample S, and focuses the emission light 144 onto the sensing plane of the imaging device. In the epifluorescence-type configuration, a part of the excitation light path and a part of the emission light path may be defined by the same optical components, such as the illustrated objective 104.

In an alternative embodiment, the objective 104 may be utilized to collect the emission light 144 only, and the excitation light 140 may be directed to the sample S from above the sample S.

The objective assembly 100 may be mounted to an objective stage (not shown), as appreciated by persons skilled in the art. The objective stage is configured to move (translate) the objective 104 along the Z-axis toward and away from the microplate 128 and thus the selected sample S, as indicated by an arrow 148. For example, the objective stage may be driven by a reversible stepper motor via a suitable transmission link (e.g., screw, worm gear, etc.). The movement or adjustment of the objective assembly 100 along the Z-axis allows the objective 104 to focus images of the sample S and scan the sample S through its thickness along the Z-axis. The objective stage may also be movable along the X-axis and the Y-axis (typically in a horizontal plane) relative to the microplate 128 to enable the objective 104 to be positioned in optical alignment with a selected sample S for irradiation and imaging.

The objective stage may also be movable (e.g., rotatable or linearly slidable) to enable different objective assemblies 100 to be selected and switched into the excitation and emission light paths. The different objective assemblies 100 may contain different objectives 104, for example objectives 104 having different magnifications. Each such objective assembly 100 may be configured as described herein. The configuration and operation of automated objective stages are generally known to persons skilled in the art, and thus need not be described in further detail in the present disclosure.

The microplate 128 is typically supported on and movable by a sample staging system (not shown), as appreciated by persons skilled in the art. The sample staging system may include a sample stage on which the microplate 128 is mounted. The sample stage has an opening below the wells 132 that enables any of the wells 132 to be selectively addressed by the objective 104. The sample staging system may also include one or more motorized carriages in mechanical communication with the sample stage. The sample staging system may include motors (e.g., reversible stepper motors) configured to drive the carriages via suitable transmission links (e.g., screws, belts, etc.). By this configuration, the carriages move (translate) the sample stage, and thus the microplate 128 and sample(s) S supported thereby, along the X-axis and the Y-axis (typically in a horizontal plane) as indicated by an arrow 152 in FIG. 1 in the case of X-axis movement. The movement of the microplate 128 relative to the objective 104 thus enables a selected sample S to be positioned in optical alignment with the field of view of the objective 104 for irradiation and imaging, as depicted in FIG. 1. Subsequently, the microplate 128 may be moved along the X-axis and/or Y-axis as needed to select another sample S contained in another well 132 and bring that other sample S into optical alignment with the lens 116 of the objective 104. The sample staging system may additionally be configured to move the microplate 128 along the Z-axis in some embodiments. The configuration and operation of automated sample staging systems are generally known to persons skilled in the art, and thus need not be described in further detail in the present disclosure.

FIG. 1 illustrates the objective assembly 100 in an operative position relative to the microplate 128 at which the selected sample S may be imaged. At the operative position, the (apex of the) lens 116 at the tip of the objective 104 is spaced from a bottom surface 160 of the microplate 128 by an axial gap 156, i.e., a distance along the Z-axis.

The liquid handling device 108 is configured to create and maintain a liquid bolus 164 on the lens 116. In particular, the liquid handling device 108 is configured to create and maintain the liquid bolus 164 in the axial gap 156 such that the liquid bolus 164 contacts both the lens 116 and the microplate bottom surface 160. As noted above, immersing the lens 116 in the liquid bolus 164 increases the numerical aperture (NA) of the lens 116 and hence the resolution (or resolving power) of the associated microscope. This is due to the liquid, or immersion medium, of the liquid bolus 164 having a higher refractive index than air. In a typical embodiment contemplated for the present subject matter, the immersion medium is water. Alternatively, the immersion medium may be a transparent oil, glycol, or other transparent liquid suitable for microscopy.

To create and maintain the liquid bolus 164, the liquid handling device 108 includes a liquid delivery system and a liquid return system. The liquid delivery system and the liquid return system may be realized by one or more structures 168 coaxially surrounding the objective 104. The liquid handling device 108 may be attached or mounted to the objective 104 in any suitable manner, such that the liquid handling device 108 and the objective 104 are movable together as a unit.

The liquid delivery system may include a delivery inlet 172, a delivery passage 176, and a delivery outlet 180 in open communication with the lens 116. The components of the liquid delivery system are configured to define a liquid delivery path, as partially depicted by arrows 184, from the delivery inlet 172, through the delivery passage 176, through the delivery outlet 180, and to the lens 116 (i.e., onto the outer surface of the lens 116 facing a region outside of the objective 104, and facing the underside of the microplate 128). When the objective assembly 100 is installed in a microscope, the delivery inlet 172 communicates with a suitable liquid source 188, e.g., a bottle or other type of reservoir for supplying the immersion medium, such as via tubing and fluidic fittings.

The delivery passage 176 may represent one or more conduits (e.g., passages, chambers, etc.) as needed to fluidly interconnect the delivery inlet 172 and the delivery outlet 180. As illustrated, at least a portion of the delivery passage 176 (where the arrows 184 are located) may be an annular, conical space surrounding the upper portion (or tip) of the objective 104. In one embodiment and as illustrated in FIG. 1, this conical space may be defined between an outer surface of a conical portion of the objective housing 112 and an inner surface of a hollow conical portion 192 of the structure 168 of the liquid handling device 108. Alternatively, the annular space may be formed as one or more passages completely internal to the conical portion 192 of the structure 168. In the illustrated embodiment, the delivery outlet 180 may be an annular opening surrounding the lens 116. The annular configuration of the delivery outlet 180 and adjacent conical portion of the delivery passage 176 may facilitate uniform distribution of liquid over the lens 116 and mitigate the introduction of bubbles that could interfere with sample imaging.

In another embodiment, the delivery outlet 180 may be a single port positioned adjacent to the lens, and/or the delivery passage 176 may be a single passage (e.g., formed in the structure 168 of the liquid handling device 108) leading from the delivery inlet 172 to the single port of the delivery outlet 180. In another embodiment, the delivery outlet 180 may be a plurality of individual ports arranged around the lens 116, i.e., circumferentially spaced from each other at different angular positions relative to the longitudinal axis L passing through the center of the lens 116. In this case, the delivery passage 176 may be a plurality of individual passages leading from the delivery inlet 172 to the respective ports of the delivery outlet 180.

The liquid return system may include a return inlet 106, a return passage 110, and a return outlet 114. The components of the liquid return system are configured to define a liquid return path, as partially depicted by arrows 118, from the lens 116, along an outer surface of the conical portion 192 of the structure 168, through the return inlet 106, through the return passage 110, and to the return outlet 114. When the objective assembly 100 is installed in a microscope, the return outlet 114 communicates with a suitable liquid receptacle 118, e.g., a bottle or other type of reservoir for recovering the immersion medium, such as via tubing and fluidic fittings.

The return inlet 106 may represent one or more openings providing fluid communication between the outer surface of the conical portion 192 of the liquid handling device 108 and the rest of the liquid return system. The return passage 110 may represent one or more conduits (e.g., passages, chambers, etc.) as needed to fluidly interconnect the return inlet 106 and the return outlet 114.

In one embodiment and as illustrated in FIG. 1, the liquid return system may further include an annular V-shaped (or triangular) channel 196 in open communication with the lens 116 via the outer surface of the conical portion 192 of the liquid handling device 108. In this case, the V-shaped channel 196 is part of the liquid return path—namely, the liquid return path runs along the outer surface of the conical portion 192, into the V-shaped channel 196, and into the return inlet 106. The annular V-shaped channel 196 may be part of or formed on one or more outer surfaces of the structure 168. The annular V-shaped channel 196 has a V-shaped (or triangular) profile coaxial with the longitudinal axis L. The V-shaped profile is evident in any elevational plane projecting radially outward from the longitudinal axis L, for example in the X-Z plane corresponding to the elevation view of FIG. 1. The annular V-shaped channel 196 is positioned at a greater radial distance from the longitudinal axis L than the annular delivery outlet 180 surrounding the lens 116. In one non-exclusive example, the angle between the two surfaces forming the V-shape of the annular V-shaped channel 196 is in a range from 60 to 100 degrees. In this embodiment, the return inlet 106 may correspond to (or communicate with) an open, annular lower vertex of the V-shaped channel 196.

In operation, the objective assembly 100 and the microplate 128 are moved to respective operative positions at which the lens 116 is optically aligned with the selected sample S and positioned with an axial gap 156 of desired distance, as illustrated in FIG. 1. A flow of liquid (immersion medium) is established from the liquid source 188, through the liquid delivery system of the liquid handling device 108, and to the lens 116. A suitable fluid pump (not shown) communicating with the liquid source 188 may be provided to establish the liquid flow on the liquid delivery side of the liquid handling device 108. As liquid is delivered to the lens 116 at a sufficient flow rate, a liquid bolus 164 forms in the axial gap 156 between, and in contact with, the lens 116 and the microplate bottom surface 160. As a non-exclusive example, the flow rate of liquid supplied to the objective assembly 100 to form the liquid bolus 164 may be in a range from 1 mL/min to 40 mL/min. In addition to the liquid flow rate through the liquid delivery system, the formation, maintenance, size, and shape of the liquid bolus 164 may depend at least in part of the size of the axial gap 156 and the surface tension of the liquid.

After imaging of the selected sample S is complete, the objective assembly 100 and/or the microplate 128 may be moved as needed into another operative position for imaging another sample S located in another well 132 of the microplate 128. During such movement, as needed the liquid may continue to be circulated over the lens 116 between the liquid delivery system and the liquid return system. Thus, even when the liquid bolus 164 is not being maintained, the lens 116 may be kept wet. Keeping the lens 116 wet may assist in removing particles and preventing particles from accumulating on the lens 116. Such particles could interfere with sample imaging and damage the lens 116 or other optics of the microscope. Keeping the lens 116 wet may also serve to prime the lens 116 for subsequently forming the liquid bolus 164. After repositioning the objective assembly 100 and/or the microplate 128 for imaging another sample S, the liquid bolus 164 is then formed again. The liquid flow rate through the liquid delivery system may be adjusted as needed for alternating between forming the liquid bolus 164 and merely keeping the lens 116 wet (such as for cleaning the lens 116). For example, the liquid flow rate may be reduced or stopped when not maintaining the liquid bolus 164.

While the liquid bolus 164 is maintained by a flow of liquid to the lens 116 at a desired liquid flow rate, any excess liquid (i.e., liquid not being utilized to maintain the liquid bolus 164 or otherwise keep the lens 116 wet) on or near the top of the objective assembly 100 drains down the outer surface of the conical portion 192 and into the annular V-shaped channel 196. The excess liquid is then removed by the liquid return system of the liquid handling device 108 and collected at the liquid receptacle 118. A suitable fluid pump (not shown) communicating with the liquid receptacle 118 may be provided to facilitate the liquid flow on the liquid return side of the liquid handling device 108. For example, the fluid pump may create suction (vacuum) at the interface of the bottom of the annular V-shaped channel 196 and the return inlet 106.

The annular, V-shaped configuration of the channel 196 facilitates continuously circulating liquid over the lens 116 between the liquid delivery system and the liquid return system, and also rapid capture and removal of excess liquid from the tip of the objective 104. The annular, V-shaped configuration of the channel 196 also promotes coalescence of individual droplets of excess liquid into larger droplets or rivulets of liquid, thereby assisting in establishing a flow of liquid through the liquid delivery system. In an embodiment, the open V-shaped channel 196 works in concert with the mechanisms of hydrostatic pressure and to deliver the liquid to an adjacent horizontally configured surface tension channel 441, which is described further below in conjunction with FIG. 4.

In an embodiment, one or both of the surfaces forming the annular V-shaped channel 196 may be treated to increase their hydrophilicity (i.e. increase their wettability, or decrease their hydrophobicity) and thereby enhance the draining of liquid into, and out from the bottom of, the annular V-shaped channel 196. For example, the surfaces of the annular V-shaped channel 196 may be treated by a suitable technique of surface functionalization, or by deposition of a suitable coating (film, layer or material, etc.), to increase hydrophilicity as appreciated by persons skilled in the art. The outer surface of the conical portion 192 of the liquid handling device 108 likewise may be treated to increase its hydrophilicity.

In an embodiment, the liquid handling device 108 may be configured to induce an electrowetting effect on one or both of the surfaces forming the annular V-shaped channel 196 to increase their hydrophilicity. In such embodiment, the surface(s) of the annular V-shaped channel 196 are composed of an electrically conductive material (e.g., a metal, metal alloy, or conductively coated plastics etc.), or additionally may be coated with an electrically insulating material (e.g., a fluoropolymer such as polytetrafluoroethylene) that is natively hydrophobic. The electrowetting effect may be induced by applying a voltage potential to one or both of the surfaces. The voltage potential renders the surface(s) more hydrophilic by reducing the contact angle (and interfacial energy) between the liquid and the surface(s), such that the liquid tends to spread out on the surface(s) and flow easier along the surface(s) as appreciated by persons skilled in the art. A further example of an electrowetting configuration is described below in conjunction with FIG. 2.

As shown in one example of a location in FIG. 1, excess liquid may include residual liquid 122 adhered to the bottom surface 160 of the microplate 128, for example as a result of a previously formed liquid bolus 164. Such residual liquid 122 is undesirable as it may separate from the microplate 128 and drip onto sensitive mechanical, optical, or electronic components of the microscope, thereby possibly causing contamination and/or damage. To prevent contact between the residual liquid 122 and such components, the residual liquid 122 may be captured and removed by the liquid handling device 108. To prevent contact between the residual liquid 122 and such components, the residual liquid 122 may be captured and removed by the annular V-shaped channel 196 as the residual liquid 122 drops onto the outer surface of the conical portion 192 of the liquid handling device 108, or drops directly into the annular V-shaped channel 196, or is otherwise drawn into the annular V-shaped channel 196 by suction.

Alternatively or additionally, in an embodiment, the liquid delivery system may be configured to remove excess liquid (including residual liquid 122) when not being utilized to deliver liquid to the lens 116. Excess liquid is drawn into the delivery outlet 180 and removed via the liquid delivery system. In such embodiment, the liquid delivery system may be referred to as a liquid delivery/recovery system. A further example of such embodiment is described below in conjunction with FIG. 2.

Accordingly, the liquid delivery system and/or the liquid return system may be utilized to capture excess liquid, and to clean and dry and the bottom surface 160 of the microplate 128 as well as the tip of the objective 104. Other techniques for cleaning and drying these components may also be utilized, such as air flow, the application of other liquids such as alcohols, and the application of a drying and conditioning pad.

Additionally, a hydrophobic wiper or roller can be passed across the top of the objective 112 and the liquid handling device 108 to displace liquid so that it is collected to the annular V-shaped channel 196. The residual liquid 122 thereby drops onto the outer surface of the conical portion 192 of the liquid handling device 108, or drops directly into the annular V-shaped channel 196, or is otherwise drawn into the annular V-shaped channel 196 by surface tension and wetting. By means of this wiper or roller the liquid bolus 164 can be reset and completely removed or bubbles on the top surface of the objective 104 can be displaced.

Figure 2:
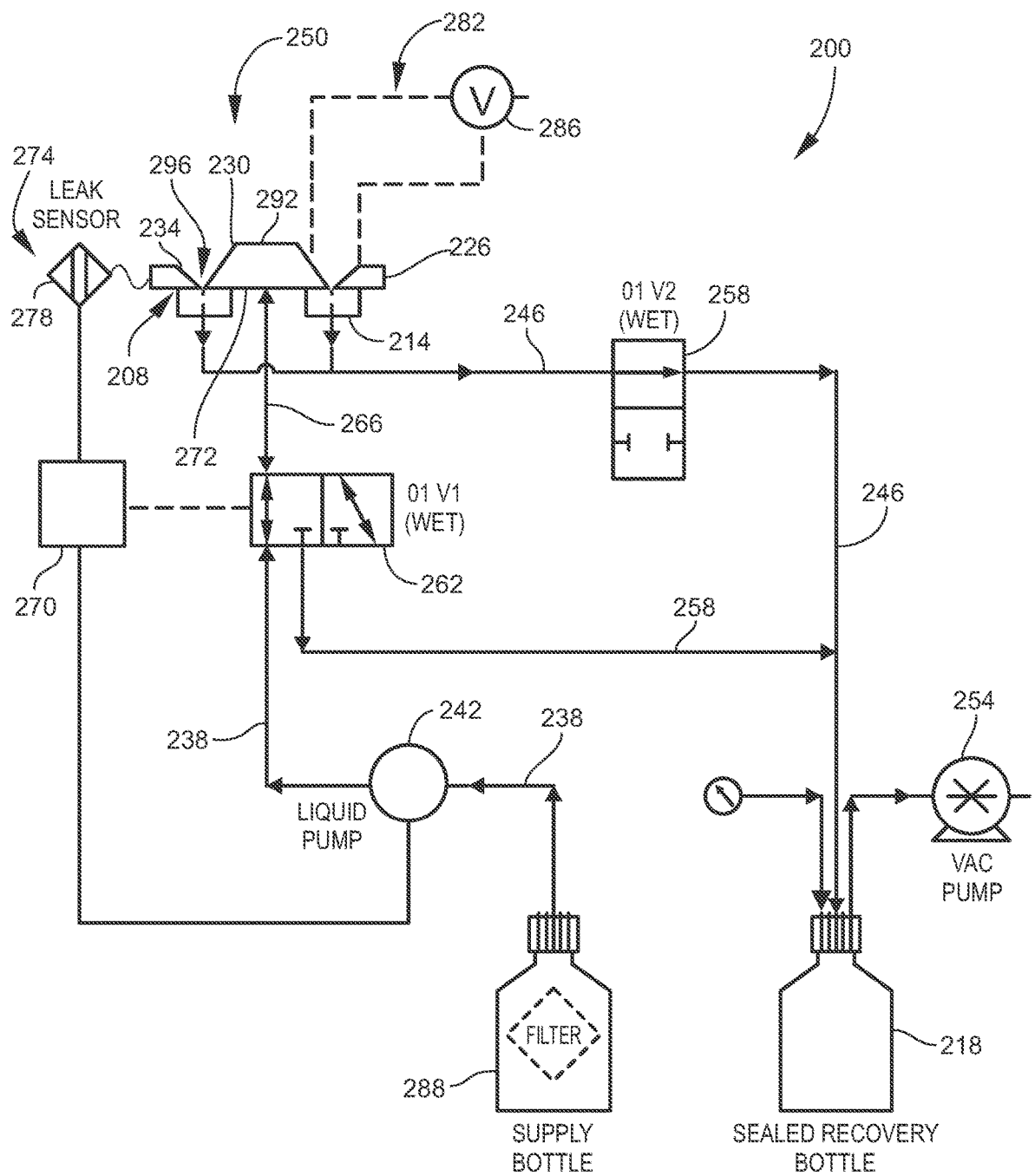
FIG. 2 is a schematic view of an example of a liquid immersion microscope objective system according to an embodiment of the present disclosure.

FIG. 2 is a schematic view of an example of a liquid immersion microscope objective system 200 according to an embodiment of the present disclosure. The system 200 includes an objective assembly 250 (partially represented in FIG. 2), a liquid source 288 (e.g., supply bottle), and a liquid receptacle 218 (e.g., recovery bottle), and other fluid handling components (e.g., conduits, pumps, valves, etc.) as needed for the objective assembly 250 and associated system 200 to operate in the manner described herein.

The objective assembly 250 may be configured according to any of the embodiments described herein, such as the objective assembly 100 illustrated in FIG. 1. Accordingly, the objective assembly 250 includes an objective (e.g., the objective 104 described above and illustrated in FIG. 1), and a liquid handling device 208 (partially represented in FIG. 2) attached to the objective. Further, the liquid handling device 208 includes a liquid delivery system fluidly communicating with the liquid source 288 via a delivery inlet 272, and a liquid return system fluidly communicating with the liquid receptacle 218 via a return outlet 214.

In the present embodiment, the liquid handling device 208 includes a hollow conical portion 292 positioned above and surrounding a conical tip of the objective, and having an opening for accommodating an optical path through the objective lens (as shown, for example, in FIG. 1). The liquid handling device 208 also includes an annular cap 226 surrounding the objective. In the present embodiment, the conical portion 292 and the annular cap 226 are physically separate components that are spaced from each other, such as by a spacer member (e.g., a gasket). The spacer member may be composed of an electrically insulating material. The liquid handling device 208 also includes an annular V-shaped (or triangular) channel 296 as described herein. The annular V-shaped channel 296 includes an inner surface 230 and an outer surface 234 defining the V-shaped (or triangular) profile of the channel 296. The inner surface 230 may be part of the conical portion 292, and the outer surface 234 may be part of the annular cap 226. With the conical portion 292 and the annular cap 226 being separate components, the lower vertex of the annular V-shaped channel 296 may be an annular opening that communicates with fluidic components of the liquid return system, such as the return outlet 214.

The liquid delivery system of the liquid handling device 208 fluidly communicates with the liquid source 288 via a liquid delivery line 238. A liquid pump 242 is operatively positioned in communication with the liquid source 288, such as in the liquid delivery line 238 between the liquid handling device 208 and the liquid source 288, for establishing liquid flow to the liquid handling device 208 at a desired flow rate (or pressure). The liquid pump 242 may be any type suitable for pumping liquid immersion media at the flow rates contemplated by the present subject matter. For example, various types of positive-displacement pumps may be suitable, one non-exclusive example being a peristaltic pump.

The liquid return system of the liquid handling device 208 fluidly communicates with the liquid receptacle 218 via a liquid return line 246. A liquid return pump 254 is operatively positioned in communication with the liquid receptacle 218 for establishing a negative pressure differential in the liquid return line 246 between the annular V-shaped channel 296 and the liquid receptacle 218, whereby liquid is aspirated into the annular V-shaped channel 296 via suction (vacuum). In the illustrated embodiment, the liquid return pump 254 is a vacuum pump positioned downstream from the liquid receptacle 218. Alternatively or additionally, a liquid pump similar to the above-described liquid pump 242 may be positioned in the liquid return line 246 between the liquid handling device 208 and the liquid receptacle 218.

A two-way valve 258 may be operatively positioned in the liquid return line 246 between the liquid handling device 208 and the liquid receptacle 218. The two-way valve 258 is configured for being switched between a first (or open, or ON) position or switch state (as illustrated) that allows suction to be actively applied at the annular V-shaped channel 296, and a second (or closed, or OFF) position or switch state that cuts off the suction (breaks the vacuum) in the liquid return line 246 and thus at the annular V-shaped channel 296.

As described above, the liquid delivery system may be configured to remove liquid from the tip of the objective assembly 250 and areas above the objective assembly 250, when not being utilized to deliver liquid to the objective assembly 250. For this purpose, the system 200 may be configured to reverse the pressure differential and thus the direction of liquid flow in the liquid delivery system, thereby creating suction at the outlet of the liquid delivery system that is proximate to the lens of the objective (e.g., the delivery outlet 180 shown in FIG. 1). In the present embodiment, the system 200 includes an aspiration line 258 for this purpose. The aspiration line 258 then may selectively communicate with a section the liquid delivery line 238 coupled to the delivery inlet 272. For example, the system 200 may include a three-way valve 262 that is switchable between a first position or switch state that fluidly couples the liquid handling device 208 (at the delivery inlet 272) with the liquid delivery line 238, and a second position or switch state that fluidly couples the liquid handling device 208 with the aspiration line 258. In the embodiment specifically illustrated, the three-way valve 262 on one side is coupled to a common liquid line 266 that in turn is coupled to the delivery inlet 272. Depending on the position of the three-way valve 262, the common liquid line 266 serves alternately as a delivery line to the liquid handling device 208 and as an aspiration line from the liquid handling device 208. The three-way valve 262 on another side is alternately coupled to the liquid delivery line 238 and the aspiration line 258, depending on its position.

At the first position of the three-way valve 262 (and as illustrated), the liquid delivery line 238 is active and the aspiration line 258 is inactive. The first position thereby allows liquid to be delivered from the liquid source 288 to the liquid handling device 208 via the liquid delivery line 238, the three-way valve 262, and the common liquid line 266, and under the influence of the liquid pump 242. At the second position, the liquid flow path through the three-way valve 262 is switched such that the aspiration line 258 is now active and the liquid delivery line 238 is now inactive. The second position thereby allows liquid to be aspirated from the liquid delivery system of the liquid handling device 208 into the aspiration line 258 via the common liquid line 266 and the three-way valve 262. The liquid pump 242 may be shut off while the second position is active. Additionally, the two way valve 258 may be energized during aspiration to increase flow rate though the common liquid line 266, thereby using the liquid return pump 254 to clear the lines 266, 258 or pull liquid from the bottom surface 160 of the microplate 128 by means of suction at the delivery outlet 180. The two way valve 258 can be energized while the liquid return pump 254 is operated to test the level of vacuum generated in the liquid receptacle 218.

In the present embodiment and as illustrated, the aspiration line 258 is coupled to the liquid return line 246 by any suitable coupling (e.g., tee connection) at a point upstream of the liquid receptacle 218. This configuration allows the aspiration line 258 and the liquid return line 246 to both utilize the same liquid receptacle 218 and vacuum source (the liquid return pump 254). Alternatively, the aspiration line 258 may be coupled to a separate liquid receptacle and vacuum source (not shown).

As further illustrated in FIG. 2, the system 200 may include or communicate with a system controller 270. The system controller 270 may represent one or more electronics-based modules (e.g., as may include one or more electronics-based processors, memories, other hardware, firmware and/or software) configured to control the operations of the system 200, including liquid delivery to and removal from the objective assembly 250. Thus, the system controller 270 may communicate with the liquid pump 242, the three-way valve 262, the liquid return pump 254, and/or the two-way valve 258, via wired or wireless communication links, as partially depicted for the liquid delivery/aspiration side of the system 200 in FIG. 2. By this configuration, the system controller 270 may control the liquid flow rates and flow paths to and from the liquid handling device 208, including the switching states of the three-way valve 262 and the two-way valve 258, as needed for wetting the objective lens, creating and maintaining a liquid bolus, and removing excess liquid as described herein.

In an embodiment, the system controller 270 may also represent the system controller of the associated microscope. Accordingly, the system controller 270 may be configured to control the operations of other components of the microscope, such as the light source, camera, stages for moving the objective assembly 250 and sample supports, wavelength/filter selectors, data acquisition and image processing, etc.

As further illustrated in FIG. 2, the system 200 may include a leak detector 274 configured to detect leakage of liquid from the top of the liquid handling device 208. For example, the leak detector 274 may be configured to detect whether liquid has not been captured by the annular V-shaped channel 296, and instead has flowed radially outward beyond the annular V-shaped channel 296 and over the outer side(s) of the liquid handling device 208. In an embodiment, the leak detector 274 includes a leak sensor 278 positioned at any location on the liquid handling device 208 or anywhere in the liquid immersion microscope objective system 200 where it is desired to check for the presence of liquid. The leak sensor 278 may be positioned, for example, at a part of the liquid handling device 208 that is located at a greater radial distance from the longitudinal axis of the liquid handling device 208 than the annular V-shaped channel 296. For example, the leak sensor 278 may be positioned at an outer perimeter or outer side(s) of the liquid handling device 208. In an embodiment, the leak sensor 278 may include two or more electrodes, for example attached to the outer perimeter or side(s) of the liquid handling device 208. The leak sensor 278 may further include appropriate leak detection electronics configured to detect a change in an electrical property of the leak sensor 278 (e.g., conductance, capacitance, resistance) in the event that liquid is present on and/or between the electrodes, thereby indicating the occurrence of leakage.

In an embodiment, the leak detection electronics may be either part of or communicate with the system controller 270. As non-exclusive examples of operation, the system controller 270 (or leak detection electronics) receives feedback signals from the leak detector 270. Based on these signals, if it is determined that leakage has occurred or is occurring, the system controller 270 may send a control signal to the liquid pump 242 appropriate for causing the liquid pump 242 to shut down or reduce the flow rate of liquid being delivered to the liquid handling device 208. As another alternative, the system controller 270 additionally may send a control signal to the three-way valve 262 appropriate for causing the three-way valve 262 to switch from the first (liquid delivery) position to the second (liquid aspiration) position, whereby liquid is drawn into the delivery inlet 272.

As a further alternative, the system controller 270 additionally may send control signals appropriate for adjusting the operation of the liquid return pump 254 and/or the two-way valve 258 so as to control the operation of the liquid return side of the system 200 in the event a leak is detected. For example, the system controller 270 may initiate the application of vacuum at the annular V-shaped channel 296 by switching the two-way valve 258 to its first (open or ON) position, and activating the liquid return pump 254 if not already activated. As another example, the system controller 270 may adjust the operation of the liquid return pump 254 to increase the level of vacuum applied in the event of leak detection.

As further illustrated in FIG. 2, the system 200 may include an electrowetting device 282 configured to induce an electrowetting effect in the annular V-shaped channel 296 and/or on other surfaces of the liquid handling device 208. The electrowetting device 282 may include an electrowetting voltage source 286 electrically coupled to the inner surface 230 and/or the outer surface 234 of the annular V-shaped channel 296 (or to other surface(s) electrically communicating with the inner surface 230 and/or outer surface 234) via electrical leads, contacts, and the like. The electrowetting voltage source 286 may be part of electronics that communicate with or are part of the system controller 270 to enable control of the operation of the electrowetting voltage source 286, including adjustment of the voltage potential(s) applied thereby.

As noted above, the microscope may provide multiple objective assemblies 100 that include different objectives 104, and enable the selection of one of the objective assemblies 100 for active operation at any given time. The system 200 described above may be configured as needed to facilitate the selection and switching out of different objective assemblies 100. For this purpose, additional fluidic components (e.g., pumps, valves, tubing, etc.) may be provided and arranged appropriately, as appreciated by persons skilled in the art.

Figure 3:
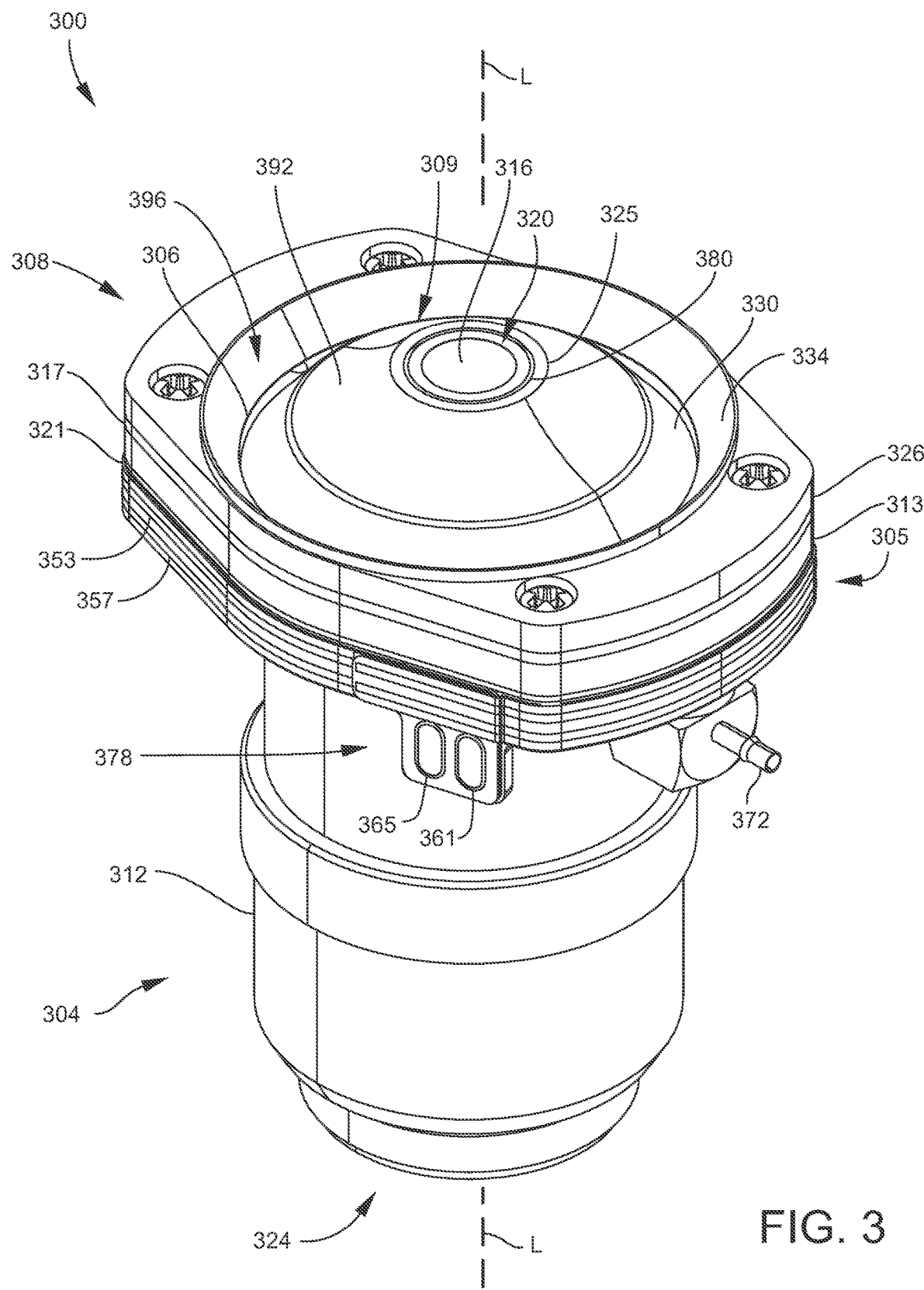
FIG. 3 is a perspective view of an example of a liquid immersion microscope objective assembly according to another embodiment of the present disclosure.
Figure 4:
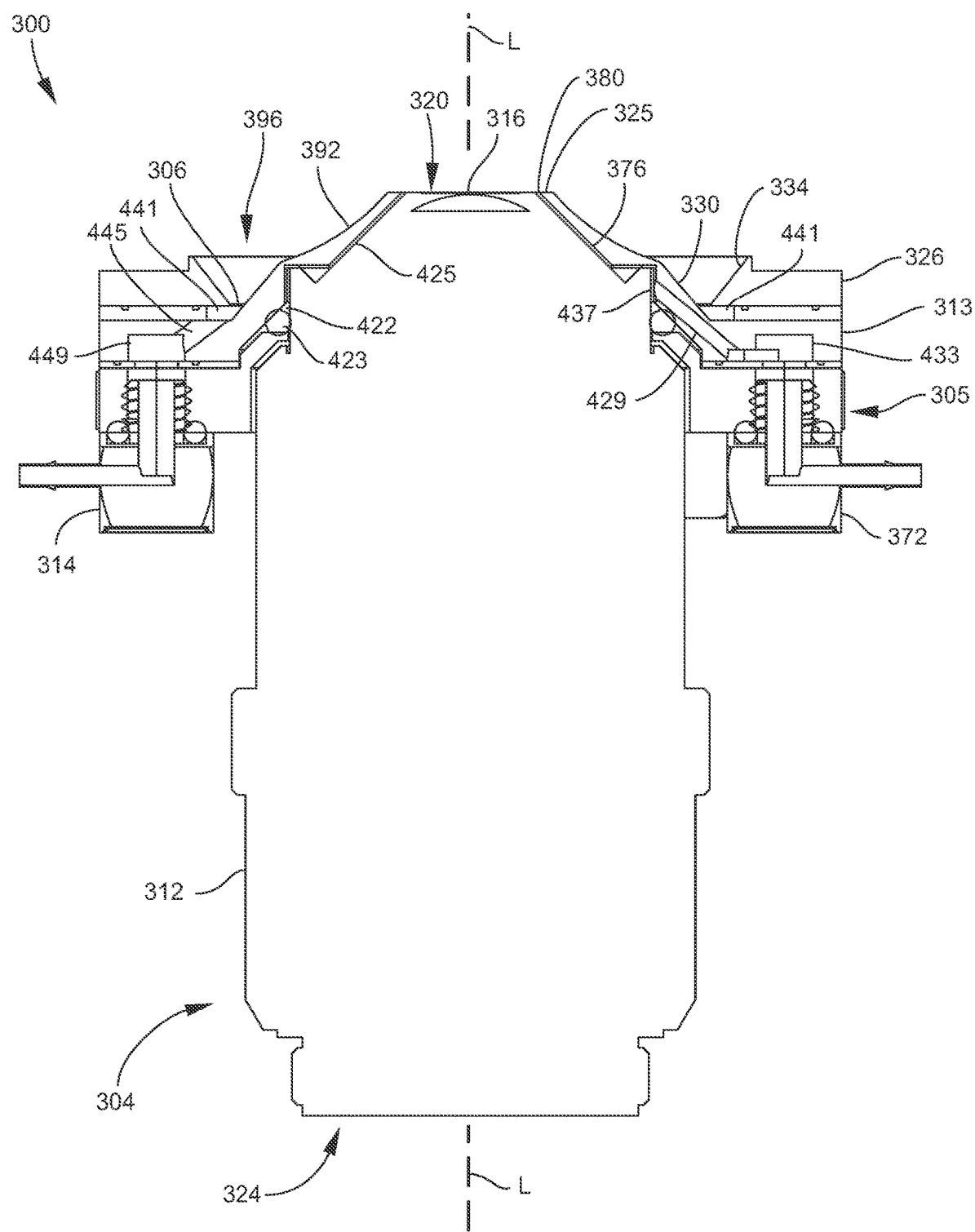
FIG. 4 is a cross-sectional elevation view of the liquid immersion microscope objective assembly illustrated in FIG. 3.
Figure 5:
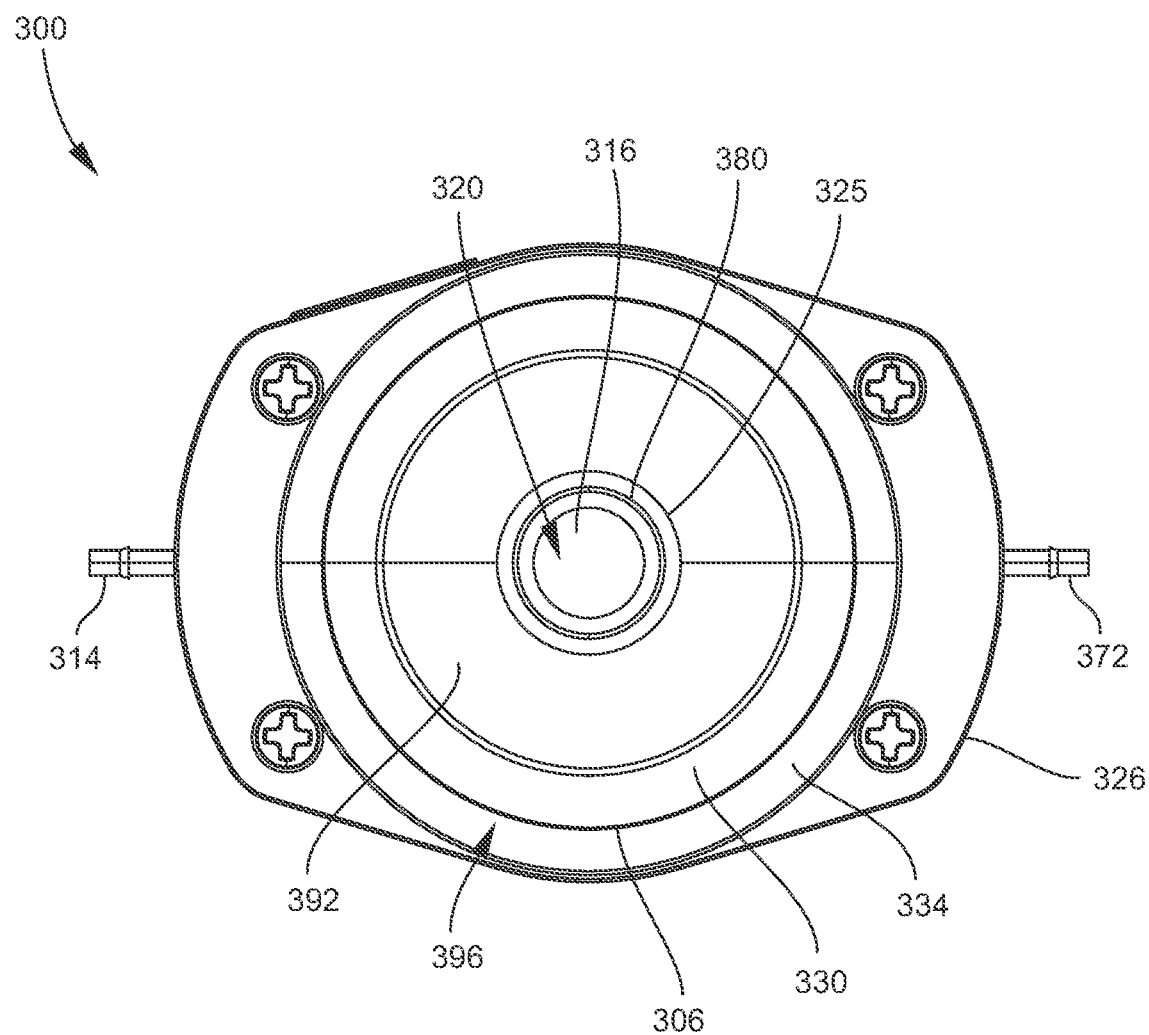
FIG. 5 is a top plan view of the liquid immersion microscope objective assembly illustrated in FIG. 3.

FIGS. 3-5 illustrate an example of a liquid immersion microscope objective assembly 300 according to another embodiment of the present disclosure. FIG. 3 is a perspective view of the objective assembly 300. FIG. 4 is a cross-sectional elevation view of the objective assembly 300 illustrated in FIG. 3. FIG. 5 is a top plan view of the objective assembly 300 illustrated in FIG. 3. The objective assembly 300 and its operation may be similar to the objective assemblies 100 and 250 described above and illustrated in FIGS. 1 and 2, respectively. Accordingly, the objective assembly 300 generally includes an objective 304 and a liquid handling device 308 arranged on a longitudinal axis L of the objective 304.

The objective 304 includes an objective housing 312 and a lens 316. The (typically cylindrical) housing 312 extends along the longitudinal axis L from a first (upper) end (or objective tip) at which a first (upper) housing opening 320 is located to a second (lower) end at which a second (lower) housing opening 324 is located. The lens 316 is mounted at or proximate to the first housing opening 320 such that an outside surface of the lens 316 faces away from the objective housing 312, i.e., faces a region outside of and above the housing 312. The lens 316 is thereby exposed through the first housing opening 320. A portion of the housing 312 is hollow and defines an optical path (generally along the longitudinal axis L) between the first housing opening 320 and the second housing opening 324, including through the illustrated lens 316 and other internal optics (not shown) provided by the objective 304.

The liquid handling device 308 is mounted or positioned at, and coaxially surrounds, an upper portion of the objective 304. In one embodiment, as illustrated in FIG. 4, the liquid handling device 308 includes an annular seat 422 having a triangular or wedge-shaped profile. An o-ring 423 is disposed in the seat 422 in contact with an outer surface of the objective housing 312. The o-ring 423 in conjunction with planar contact is utilized to affix and maintain alignment of the liquid handling device 308 with the objective 304.

The liquid handling device 308 includes a liquid delivery system and a liquid return system as described herein. Accordingly, the liquid handling device 308 is configured to perform various functions described herein, including immersing the lens 316 (particularly the outer lens surface) in a liquid immersion medium, and removing liquid from the lens 316 and the surrounding objective tip, and from nearby regions such as the bottom of a sample support.

In the present embodiment, the liquid handling device 308 includes an annular base 305, a hollow cone 309, and an annular cap 326 cooperatively defining the liquid delivery system and the liquid return system. The cone 309 includes a (first) conical portion 392 spaced above the objective tip, and a flange portion 313 adjoining the conical portion 392. The flange portion 313 is interposed between the base 305 and the cap 326, and is separated from the base 305 and the cap 326 by respective annular spacer members 317 and 321. These components may be secured together in a stacked arrangement by suitable fasteners such as threaded members (e.g., screws, bolts, etc.). The spacer members 317 and 321 may be composed of any suitable elastomeric materials, which may serve as fluidic seals or additionally as electrical insulators. The cone 309 further includes an annular rim 325 coaxial with the longitudinal axis L and surrounding the lens 316. The rim 325 defines a device opening through which the lens 316 is exposed. The rim 325 transitions to the conical portion 392. In the present context, the term "annular" encompasses not only a circular shape but also other rounded shapes such as an elliptical or oval shape.

The liquid handling device 308 further includes a delivery inlet 372 and a return outlet 314 (FIG. 4), which may be embodied as fluidic fittings coupled (e.g., by screw threads) to internal passages in the base 305. The delivery inlet 372 and the return outlet 314 may be coupled to tubing, as may be part of liquid lines such as described above and illustrated in FIG. 2.

The liquid delivery system includes the delivery inlet 372, a delivery passage, and a delivery outlet 380 in open communication with the lens 316 (i.e, the space in the device opening above the outer lens surface). The components of the liquid delivery system cooperatively define a liquid delivery path from the delivery inlet 372, through the delivery passage, through the delivery outlet 380, and to the lens 316. The delivery passage may include one or more conduits (e.g., passages, chambers, etc.) as needed to fluidly interconnect the delivery inlet 372 and the delivery outlet 380. In the present embodiment and as illustrated in FIG. 4, the delivery passage includes an annular, conical space 376 defined between an outside surface of a (second) conical portion 425 of the objective housing 312 and an inside surface of the conical portion 392 of the cone 309. The conical space 376 terminates at the delivery outlet 380. In the present embodiment, the delivery outlet 380 is an annular opening defined between the rim 325 and the first housing opening 320, such that the delivery outlet 380 coaxially surrounds the first housing opening 320 and the lens 316. As illustrated in FIG. 4, the delivery passage may further include an internal conduit 429 formed in the cone 309. The internal conduit 429 extends from another conduit or chamber 433 (e.g., formed in the cone 309 and/or the base 305) communicating with the delivery inlet 372, to an opening in a wall 437 of the cone 309, which opening in turn communicates with the conical space 376.

In another embodiment, instead of an annular conical space 376 and annular delivery outlet 380, the delivery passage may include one or more conduits similar to the illustrated internal conduit 429, but leading from the delivery inlet 372 to one or more corresponding ports located at (or near) the rim 325 and thus opening into the space in the device opening above the lens 116.

The liquid path defined by the liquid delivery system may also be utilized as a liquid aspiration (removal) path, as described above in conjunction with FIG. 2.

The liquid return system includes an annular V-shaped (or triangular) channel 396 in open communication with the lens 316 (via the conical portion 392), a return inlet 306, a return passage, and the return outlet 314 (FIG. 4). The components of the liquid return system cooperatively define a liquid return path from the lens 316, along the outer surface of the conical portion 392, into the annular V-shaped channel 396, through the return inlet 306, through the return passage, and to the return outlet 314.

In the present embodiment, the annular V-shaped channel 396 includes an annular inner surface 330 and an annular outer surface 334 defining the V-shaped (or triangular) profile of the V-shaped channel 396. As illustrated, the inner surface 330 may be part of the conical portion 392, and the outer surface 334 may be part of the annular cap 326. At the lower vertex of the annular V-shaped channel 396, the inner surface 330 and the outer surface 334 remain separated by an annular opening corresponding to the return inlet 306.

In an embodiment, the inner surface 330 and/or the outer surface 334 of the annular V-shaped channel 396 may be treated to increase their hydrophilicity as described herein. Alternatively or additionally, one or more other surfaces of the liquid handling device 308 potentially exposed to liquid may be treated in the same manner. Alternatively or additionally, the inner surface 330 and/or the outer surface 334, and/or one or more other surfaces of the liquid handling device 308, may be placed in communication with an electrowetting device as described herein.

The return passage of the liquid return system may include one or more conduits (e.g., passages, chambers, etc.) as needed to fluidly interconnect the return inlet 306 and the return outlet 314. In the present embodiment and as shown in FIG. 4, the return passage includes a horizontally configured, annular surface tension channel 441 communicating with the V-shaped channel 396 via the return inlet 306. The V-shaped channel 396, return inlet 306, and surface tension channel 441 are configured (i.e., in terms of size and shape) such that the V-shaped channel 396 works in concert with the mechanisms of hydrostatic pressure and surface tension to deliver the liquid to the adjacent surface tension channel 441. As liquid fills the V-shaped channel 396, the buildup of hydrostatic pressure forces liquid into the surface tension channel 441. This in turn through surface tension pulls the liquid from anywhere around the 360 degree periphery of the V-shaped channel 396 into the surface tension channel 441. In the illustrated example, the surface tension channel 441 is defined between the stacked portions of the annular cap 326 and the flange portion 313 of the cone 309.

As also shown in FIG. 4, the return passage may further include an internal conduit 445 formed in the flange portion 313 of the cone 309. The internal conduit 445 extends from another conduit or chamber 449 (e.g., formed in the cone 309 and/or the base 305) communicating with the return outlet 314, to an opening in a wall of the surface tension channel 441 below the V-shaped channel 396.

As best shown in FIG. 3, the objective assembly 300 further includes a leak sensor 378. The leak sensor 378 includes one or more leak sensing electrodes, for example electrodes 353 and 357, attached to and extending around (all or part of) an outer perimeter or side wall of the base 305. The leak sensing electrodes 353 and 357 communicate with respective electrical terminals or contacts 361 and 365, which may in turn be placed in communication with a suitable leak detector, such as the leak detector 274 described above and illustrated in FIG. 2.

Figure 6:
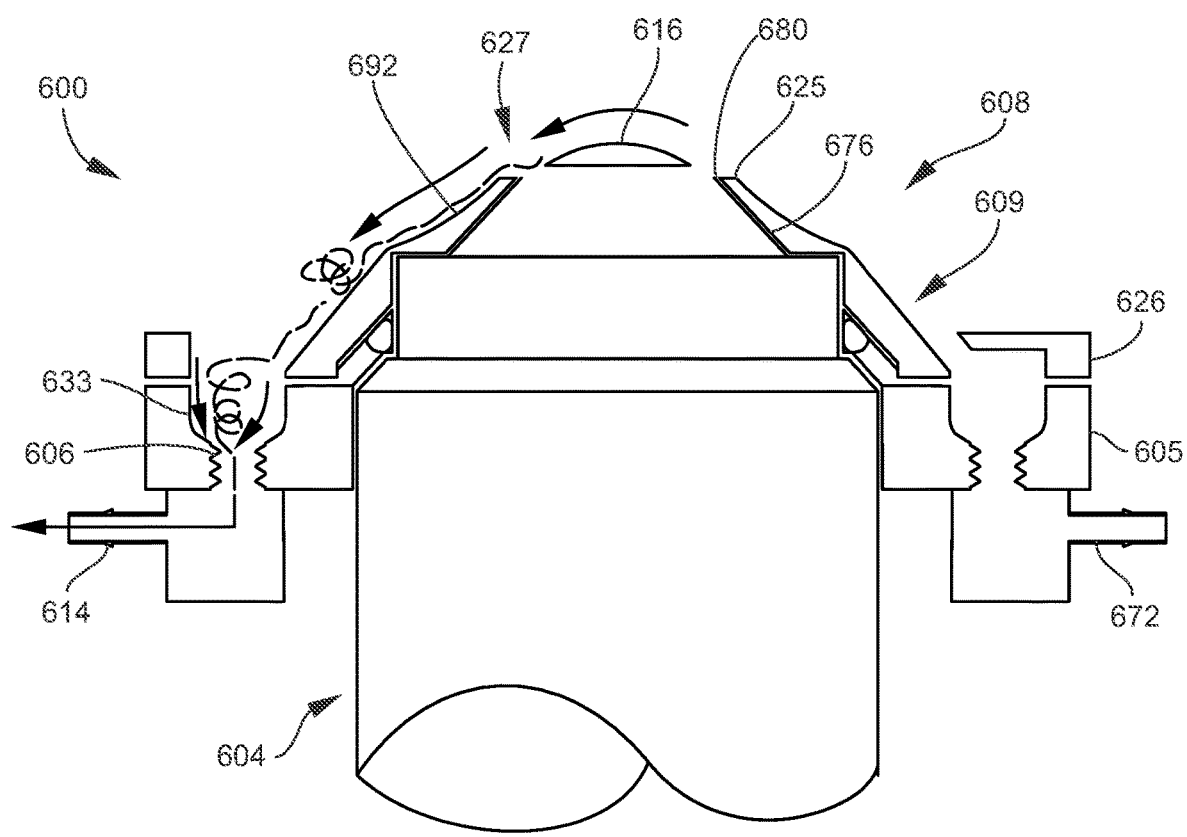
FIG. 6 is a schematic, cross-sectional elevation view of a liquid immersion microscope objective assembly according to another embodiment of the present disclosure.
Figure 7:
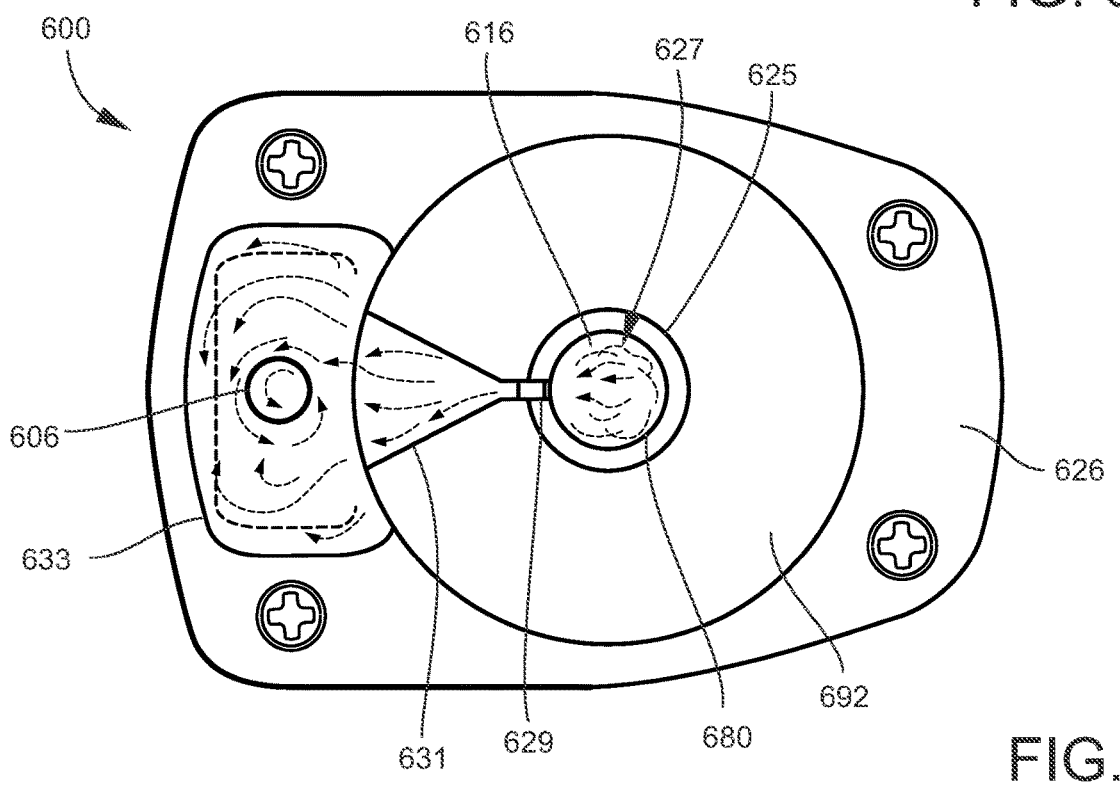
FIG. 7 is a top plan view of the liquid immersion microscope objective assembly illustrated in FIG. 6.

FIG. 6 is a schematic, cross-sectional elevation view of a liquid immersion microscope objective assembly 600 according to another embodiment of the present disclosure. FIG. 7 is a top plan view of the objective assembly 600 illustrated in FIG. 6.

As in other embodiments, the objective assembly 600 generally includes an objective 604 and a liquid handling device 608 arranged on the longitudinal axis of the objective 604. Further, the objective 604 includes a lens 616 mounted at or near a housing opening of the objective 604, such that the lens 616 is exposed through the housing opening. As in other embodiments, the liquid handling device 608 is mounted or positioned at, and coaxially surrounds, an upper portion of the objective 604, as disclosed elsewhere in the present disclosure. Further, the liquid handling device 608 includes a liquid delivery system and a liquid return system as described herein. Accordingly, the liquid handling device 608 is configured to perform various functions described herein, including immersing the lens 616 (particularly the outer lens surface) in a liquid immersion medium, and removing liquid from the lens 616 and the surrounding objective tip, and from nearby regions such as the bottom of a sample support.

Similar to the embodiment illustrated in FIGS. 3-5, the structure of the liquid handling device 608 may include an annular base 605, a hollow cone 609, and an annular cap 626 cooperatively defining the liquid delivery system and the liquid return system. The cone 609 includes a conical portion 692 spaced above the objective tip. The cone 609 further includes an annular rim 625 coaxial with the longitudinal axis (passing through the center of the lens 616) and surrounding the lens 616. The rim 625 defines a device opening 627 through which the lens 616 is exposed. The rim 625 transitions to the conical portion 692. In the present embodiment, the rim 625 has a discontinuity in its geometry, such as a notch 629 as illustrated in FIG. 7 and as described further below.

As in other embodiments, the liquid handling device 608 may generally include a delivery inlet 672 and a return outlet 614 embodied as fluidic fittings coupled to internal passages of the liquid handling device 608. Moreover, the delivery inlet 672 and the return outlet 614 may be coupled to a fluidic system such as the liquid immersion microscope objective system 200 described above and illustrated in FIG. 2.

The liquid delivery system includes the delivery inlet 672, a delivery passage, and a delivery outlet 680 in open communication with the lens 616. The components of the liquid delivery system cooperatively define a liquid delivery path from the delivery inlet 672, through the delivery passage, through the delivery outlet 680, and to the lens 616. The delivery passage may include one or more conduits (e.g., passages, chambers, etc.) as needed to fluidly interconnect the delivery inlet 672 and the delivery outlet 680. For example, the delivery passage may include an annular, conical space 676 between the delivery inlet 672 and the delivery outlet 680, and the delivery outlet 680 may be an annular opening, and may further include other internal conduits, as described above in conjunction with the embodiment illustrated in FIGS. 3-5. Alternatively, the delivery passage may include one or more conduits leading from the delivery inlet 672 to one or more corresponding ports located at or near the rim 625, as also described above.

As in other embodiments, the liquid path defined by the liquid delivery system may also be utilized as a liquid aspiration (removal) path, as described above in conjunction with FIG. 2.

The liquid return system includes the notch 629 in open communication with the lens 616 (e.g., the space above the outer surface of the lens 616 surrounded by the rim 625), a return inlet 606, and the return outlet 614. The components of the liquid return system cooperatively define a liquid return path from the lens 616 and device opening 627, through the notch 629, along the conical surface (e.g., the outer surface of the conical portion 692), into the return inlet 606, and to the return outlet 614.

In some embodiments, the return inlet 606 and the return outlet 614 may be part of the same fluidic component (e.g., a fitting). A return passage (e.g., an internal conduit) may be provided as needed to fluidly interconnect the return inlet 606 and the return outlet 614.

The notch 629 may be formed on (as part of) the conical portion 692. By presenting a geometric discontinuity adjacent to the area where the liquid bolus is formed on the lens 616, the notch 629 catches liquid in this area and draws the liquid into the notch 629. In this manner, the notch 629 directs liquid to flow along the outer surface of the conical portion 692 on the side of the lens 616 at which the notch 629 is located, and into the return inlet 606 that is located on the same side of the lens 616 as the notch 629. Liquid flow is generally depicted by arrows in FIGS. 6 and 7.

To facilitate collecting the liquid entering the notch 629 and directing the liquid to flow toward the return inlet 606, the liquid handling device 608 may further include a liquid return channel (or spillway) 631 (FIG. 7) running from the notch 629 toward the return inlet 606. In one embodiment, the return channel 631 is disposed on the conical portion 692. That is, the return channel 631 may be positioned on the conical portion 692, or formed on the conical portion 692 (e.g., as part of a surface of the conical portion 692). Generally, the return channel 631 has a length between the notch 629 and the return inlet 606, and a width transverse to the length. In one embodiment and as illustrated in FIG. 7, the width of the return channel 631 increases along the length of the return channel 631 in a direction away from the notch 629, i.e. the return channel 631 tapers or fans outward from the notch 629. Also to facilitate collecting the liquid entering the notch 629, the liquid handling device 608 may further include a basin (or bucket) 633 positioned between and communicating with the return channel 631 and the return inlet 606. For example, the basin 633 may be positioned (or formed in a part of the structure of the liquid handling device 608) adjacent to the conical portion 692. The dimensions of the basin 633 may be significantly larger than the dimensions of the notch 629, the return channel 631, and the return inlet 606. Accordingly, in some embodiments, the liquid return path includes the return channel 631, or both the return channel 631 and the basin 633, in addition to the notch 629 and the return inlet 606.

The objective assembly 600 may in other respects be similar to the objective assembly 300 described above and illustrated in FIGS. 3-5. For example, the objective assembly 600 may include a leak sensor as described herein. The objective assembly 600 may be utilized in conjunction with a system such as the liquid immersion microscope objective system 200 described above and illustrated in FIG. 2.

FIG. 8 is a schematic, cross-sectional elevation view of a liquid immersion microscope objective assembly 800 according to another embodiment of the present disclosure. FIG. 9 is a top plan view of the objective assembly 800 illustrated in FIG. 8.

As in other embodiments, the objective assembly 800 generally includes an objective 804 and a liquid handling device 808 arranged on the longitudinal axis of the objective 804. Further, the objective 804 includes a lens 816 mounted at or near a housing opening of the objective 804, such that the lens 816 is exposed through the housing opening. As in other embodiments, the liquid handling device 808 is mounted or positioned at, and coaxially surrounds, an upper portion of the objective 804, as disclosed elsewhere in the present disclosure. Further, the liquid handling device 808 includes a liquid delivery system and a liquid return system as described herein. Accordingly, the liquid handling device 808 is configured to perform various functions described herein, including immersing the lens 816 (particularly the outer lens surface) in a liquid immersion medium, and removing liquid from the lens 816 and the surrounding objective tip, and from nearby regions such as the bottom of a sample support.

As in other embodiments, the liquid handling device 808 may include a hollow cone 809 that includes a conical portion 892 spaced above the objective tip. The cone 809 further includes an annular rim 825 coaxial with the longitudinal axis (passing through the center of the lens 816) and surrounding the lens 816. The rim 825 defines a device opening 827 through which the lens 816 is exposed.

As in other embodiments, the liquid handling device 808 may include a delivery inlet 872 and a return outlet 814, which may be embodied as fluidic fittings coupled to internal passages of the liquid handling device 808 as described herein. Moreover, the delivery inlet 872 and the return outlet 814 may be coupled to a fluidic system such as the liquid immersion microscope objective system 200 described above and illustrated in FIG. 2.

The liquid delivery system includes the delivery inlet 872, a delivery passage 835, and a delivery outlet 880 in open communication with the lens 816. The components of the liquid delivery system cooperatively define a liquid delivery path from the delivery inlet 872, through the delivery passage 835, through the delivery outlet 880, and to the lens 816. In the present embodiment and as illustrated in FIGS. 8 and 9, the delivery passage 835 may be a single conduit (e.g., formed in or extending through the structure of the liquid handling device 808) interconnecting the delivery inlet 872 and the delivery outlet 880. Further, the delivery outlet 880 may be a single port located adjacent to the lens 816. Accordingly, the delivery outlet 880 and the notch 829 are located at different angular positions relative to a center of the lens 816. In particular, the delivery outlet 880 may be located on a side of the lens 816 opposite to the notch 829.

As in other embodiments, the liquid path defined by the liquid delivery system may also be utilized as a liquid aspiration (removal) path, as described above in conjunction with FIG. 2.

Similar to the embodiment illustrated in FIGS. 6 and 7, the rim 825 includes a notch 829, and the liquid handling device 808 further includes a liquid return channel (or spillway) 831 and a basin or bucket 833. Moreover, the width of the return channel 831 may increase along the length of the return channel 831 in a direction away from the notch 829, and the dimensions of the basin 833 may be larger than the dimensions of the notch 829, the return channel 831, and a return inlet 806.

Unlike the embodiment illustrated in FIGS. 6 and 7, the return channel 831 and the basin 833 are internal features of the structure of the liquid handling device 808. For example, in the present embodiment, the return channel 831 is positioned or formed on an inside surface of the conical portion 892 (i.e., a surface internal to the conical portion 892), instead of an outside surface of the conical portion 892 (i.e., a surface external to the conical portion).

Thus, the liquid return system includes the notch 829 in open communication with the lens 816 (e.g., the space above the outer surface of the lens 816 surrounded by the rim 825), the return channel 831, the basin 833, the return inlet 806, and the return outlet 814. The components of the liquid return system cooperatively define a liquid return path from the lens 816, along the return channel 831, into the basin 833, into the return inlet 806, and to the return outlet 814.

In some embodiments, the return inlet 806 and the return outlet 814 may be part of the same fluidic component (e.g., a fitting). A return passage (e.g., an internal conduit) may be provided as needed to fluidly interconnect the return inlet 806 and the return outlet 814.

The objective assembly 800 may in other respects be similar to the objective assembly 300 described above and illustrated in FIGS. 3-5. For example, the objective assembly 800 may include a leak sensor as described herein. The objective assembly 800 may be utilized in conjunction with a system such as the liquid immersion microscope objective system 200 described above and illustrated in FIG. 2.

Figure 10:
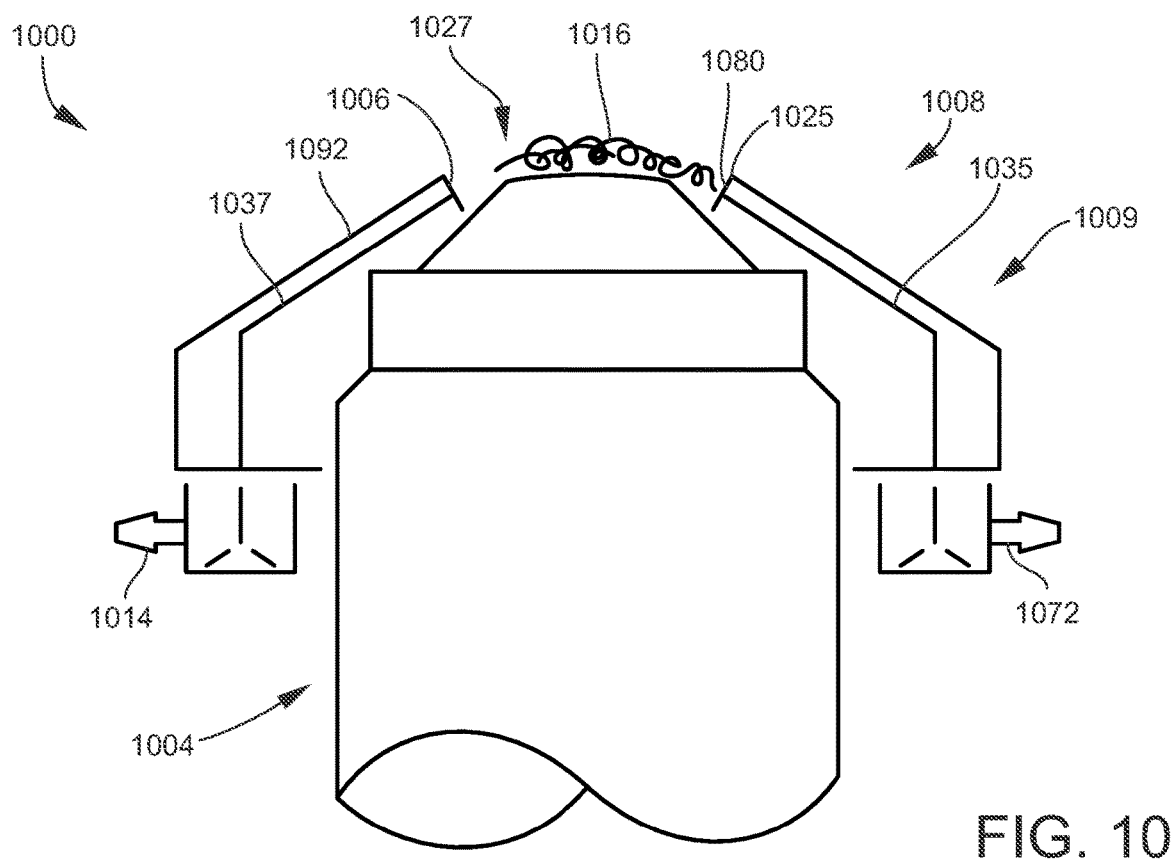
FIG. 10 is a schematic, cross-sectional elevation view of a liquid immersion microscope objective assembly according to another embodiment of the present disclosure.
Figure 11:
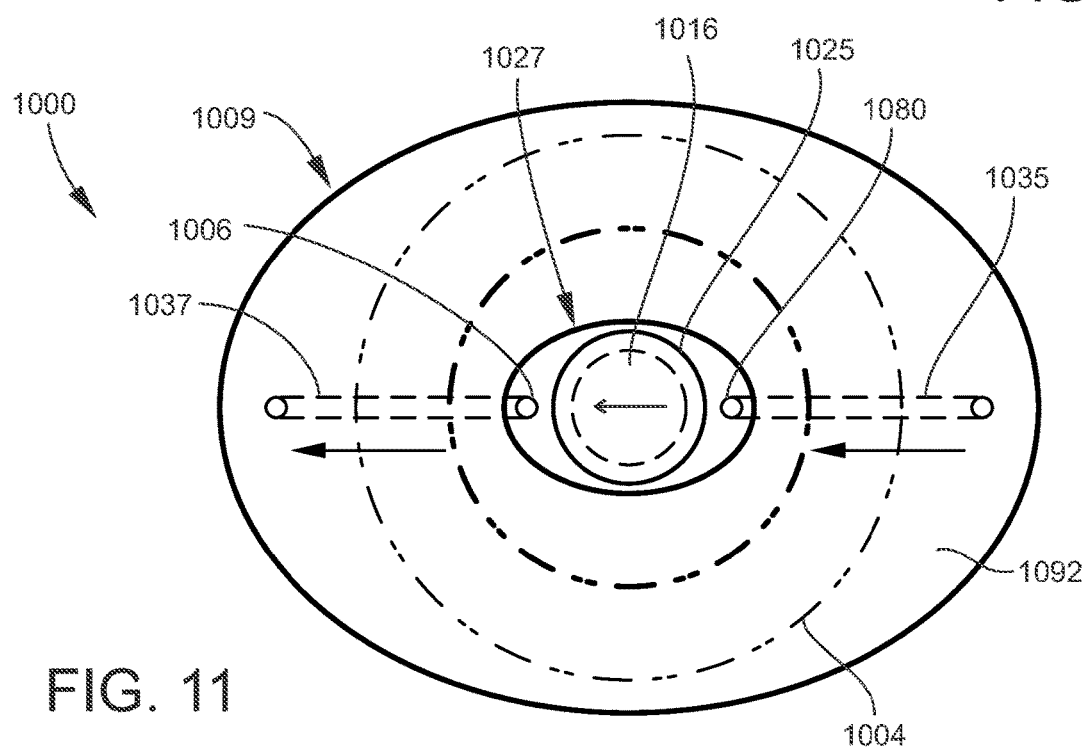
FIG. 11 is a top plan of the objective assembly illustrated in FIG. 10.

FIG. 10 is a schematic, cross-sectional elevation view of a liquid immersion microscope objective assembly 1000 according to another embodiment of the present disclosure. FIG. 11 is a top plan of the objective assembly 1000 illustrated in FIG. 10.

As in other embodiments, the objective assembly 1000 generally includes an objective 1004 and a liquid handling device 1008 arranged on the longitudinal axis of the objective 1004. Further, the objective 1004 includes a lens 1016 mounted at or near a housing opening of the objective 1004, such that the lens 1016 is exposed through the housing opening. As in other embodiments, the liquid handling device 1008 is mounted or positioned at, and coaxially surrounds, an upper portion of the objective 1004, as disclosed elsewhere in the present disclosure. Further, the liquid handling device 1008 includes a liquid delivery system and a liquid return system as described herein. Accordingly, the liquid handling device 1008 is configured to perform various functions described herein, including immersing the lens 1016 (particularly the outer lens surface) in a liquid immersion medium, and removing liquid from the lens 1016 and the surrounding objective tip, and from nearby regions such as the bottom of a sample support.

As in other embodiments, the liquid handling device 1008 may include a hollow cone 1009 that includes a conical portion 1092 spaced above the objective tip. The cone 1009 further includes an annular rim 1025 coaxial with the longitudinal axis (passing through the center of the lens 1016) and surrounding the lens 1016. The rim 1025 defines a device opening 1027 through which the lens 1016 is exposed.

As in other embodiments, the liquid handling device 1008 may include a delivery inlet 1072 and a return outlet 1014, which may be embodied as fluidic fittings coupled to internal passages of the liquid handling device 1008 as described herein. Moreover, the delivery inlet 1072 and the return outlet 1014 may be coupled to a fluidic system such as the liquid immersion microscope objective system 200 described above and illustrated in FIG. 2.

The liquid delivery system includes the delivery inlet 1072, a delivery passage 1035, and a delivery outlet 1080 in open communication with the lens 1016. The components of the liquid delivery system cooperatively define a liquid delivery path from the delivery inlet 1072, through the delivery passage 1035, through the delivery outlet 1080, and to the lens 1016. In the present embodiment and as illustrated in FIGS. 10 and 11, the delivery passage 1035 may be a single conduit (e.g., formed in or extending through the structure of the liquid handling device 1008) interconnecting the delivery inlet 1072 and the delivery outlet 1080. Further, the delivery outlet 1080 may be a single port located adjacent to the lens 1016.

The liquid return system includes a return inlet 1006 in open communication with the lens 1016, a return passage 1037, and the return outlet 1014. The components of the liquid return system cooperatively define a liquid return path from the lens 1016, into the return inlet 1006, through the return passage 1037, and the return outlet 1014. In the present embodiment, liquid return system is configured the same as or similarly to the liquid delivery system. As illustrated in FIGS. 10 and 11, the return passage 1037 may be a single conduit (e.g., formed in or extending through the structure of the liquid handling device 1008) interconnecting the return inlet 1006 and the return outlet 1014. Further, the return inlet 1006 may be a single port located adjacent to the lens 1016. Thus, as single ports, the delivery outlet 1080 and the return inlet 1006 are located at different angular positions relative to a center of the lens 1016. In particular, the delivery outlet 1080 and the return inlet 1006 may be located on opposite sides of the lens 1016 to each other.

In FIG. 11, arrows depict the general direction of liquid flow to and from the lens 1016 based on the configuration just described. However, in the present embodiment, the objective assembly 1000 (and an associated fluidic system, such as the liquid immersion microscope objective system 200 described above and illustrated in FIG. 2) may be configured such that the direction of liquid flow is reversible on either side of the lens 1016. Thus, the above-described liquid delivery system may be selectively operated a liquid return (or removal, or recovery) system (e.g., by applying vacuum to the liquid delivery side), and the above-described liquid return system may be selectively operated a liquid delivery system. The ability to reverse the direction of liquid flow (and thereby switch the roles of the delivery outlet 1080 and the return inlet 1006) may be useful, for example, when changing the direction of movement of the objective assembly 1000 (e.g., when moving from one sample container 132 to another, or from one microplate 128 to another, etc.).

The objective assembly 1000 may in other respects be similar to the objective assembly 300 described above and illustrated in FIGS. 3-5. For example, the objective assembly 1000 may include a leak sensor as described herein. The objective assembly 1000 may be utilized in conjunction with a system such as the liquid immersion microscope objective system 200 described above and illustrated in FIG. 2.

Figure 12:
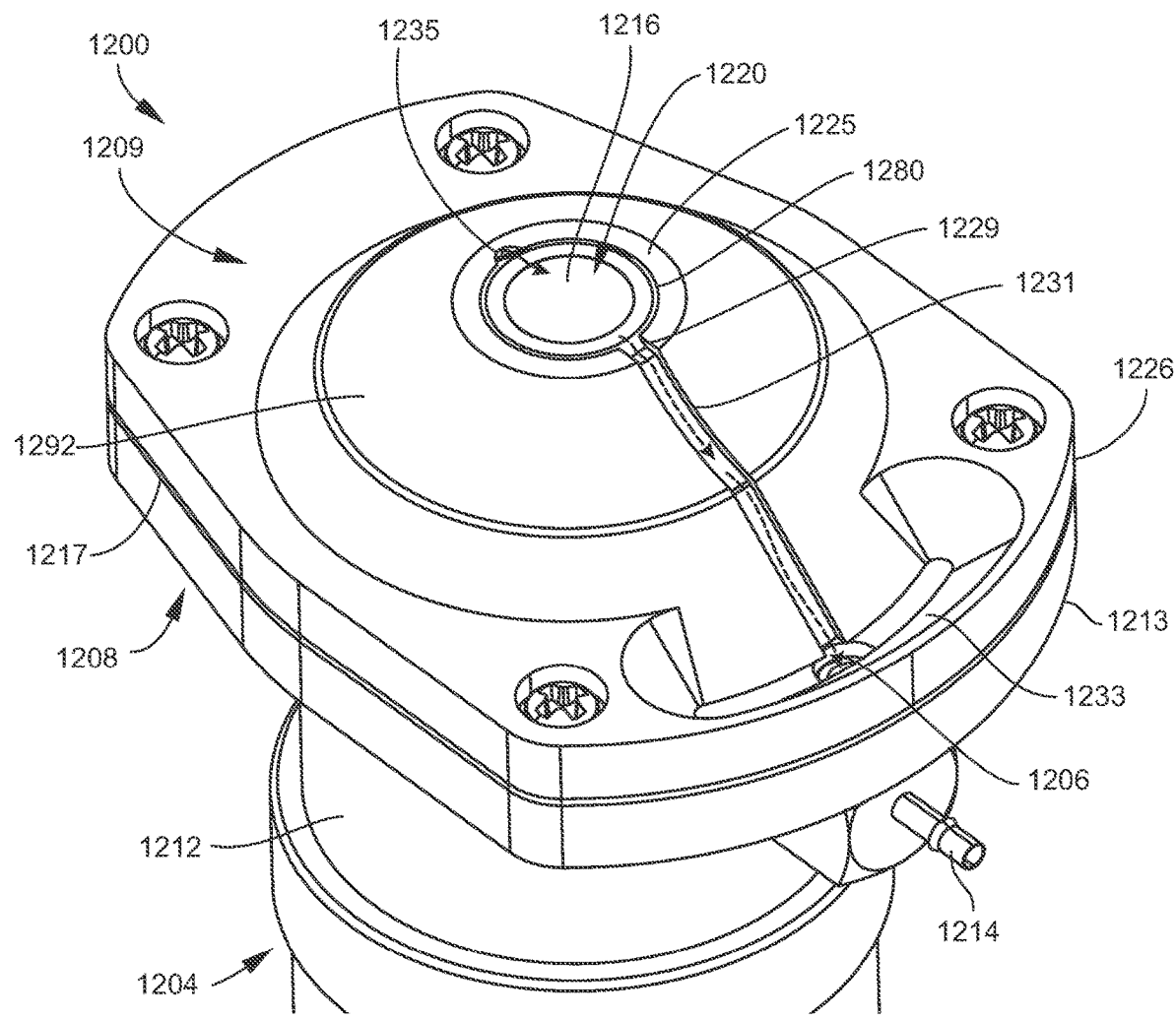
FIG. 12 is a perspective view of a liquid immersion microscope objective assembly according to another embodiment of the present disclosure.
Figure 13:
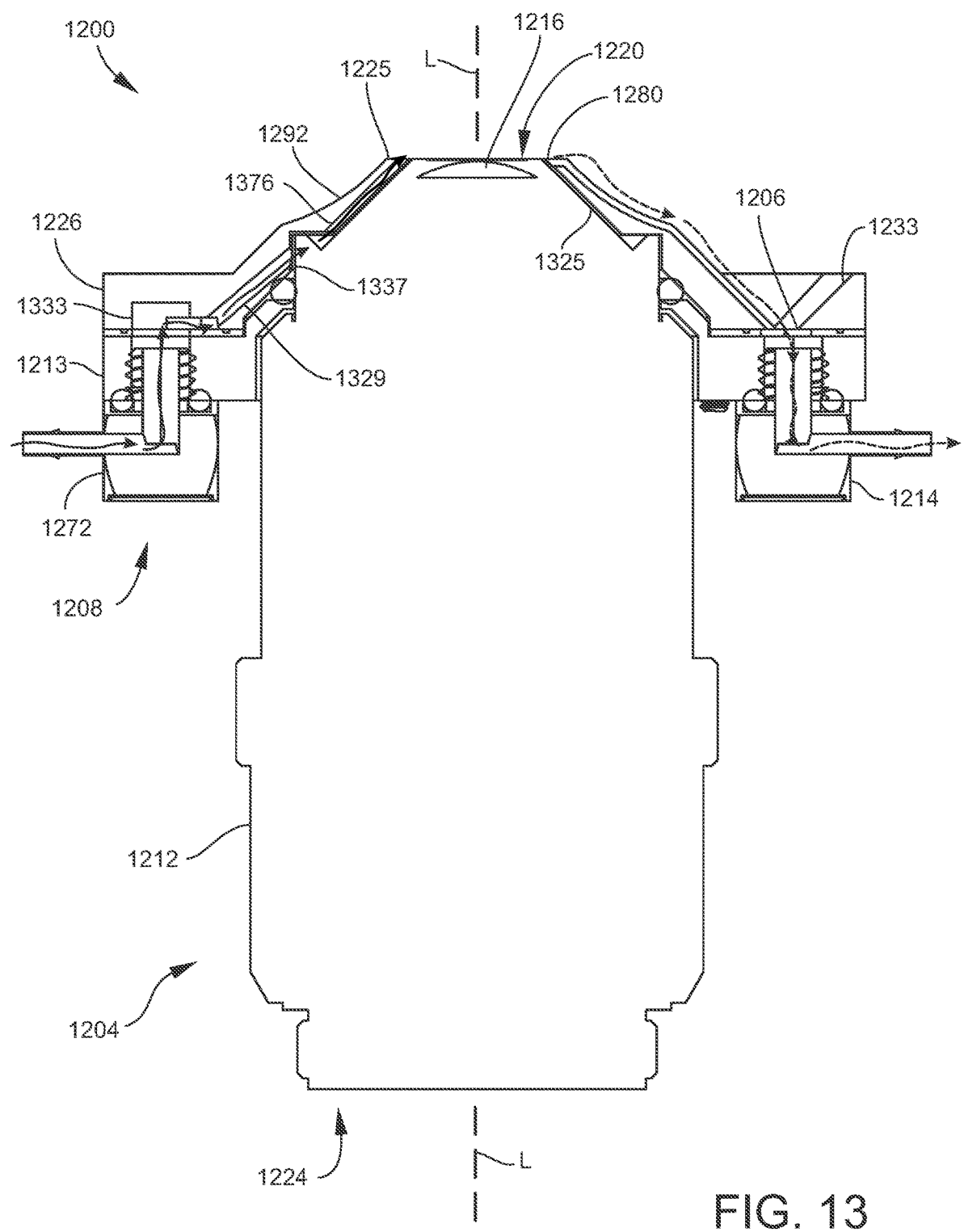
FIG. 13 is a cross-sectional elevation view of the objective assembly illustrated in FIG. 12.
Figure 14:
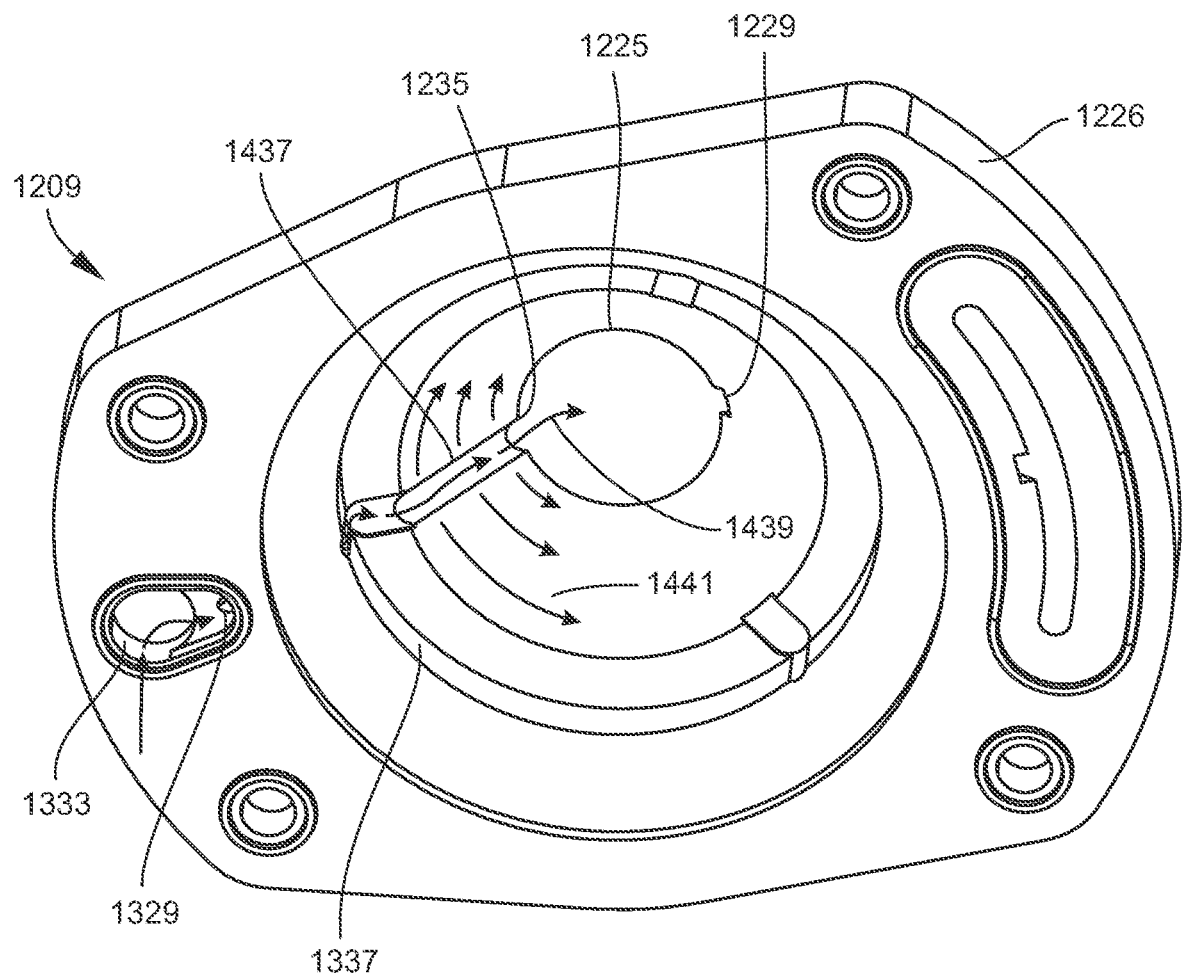
FIG. 14 is a perspective view of the underside of a cone of the objective assembly illustrated in FIG. 12.

FIGS. 12-14 illustrate an example of a liquid immersion microscope objective assembly 1200 according to another embodiment of the present disclosure. FIG. 12 is a perspective view of the objective assembly 1200. FIG. 13 is a cross-sectional elevation view of the objective assembly 1200 illustrated in FIG. 12. FIG. 14 is a perspective view of the underside of a cone 1209 of the objective assembly 1200 illustrated in FIG. 12. The objective assembly 1200 and its operation may be similar to one or more other embodiments described herein. Accordingly, the objective assembly 1200 generally includes an objective 1204 and a liquid handling device 1208 arranged on a longitudinal axis L of the objective 1204.

The objective 1204 includes an objective housing 1212 and a lens 1216. The housing 1212 extends along the longitudinal axis L from a first (upper) end (or objective tip) at which a first (upper) housing opening 1220 is located to a second (lower) end at which a second (lower) housing opening 1224 is located. The lens 1216 is mounted at or proximate to the first housing opening 1220 such that an outside surface of the lens 1216 faces away from the objective housing 1212, i.e., faces a region outside of and above the housing 1212. The lens 1216 is thereby exposed through the first housing opening 1220.

As in other embodiments, the liquid handling device 1208 is mounted or positioned at, and coaxially surrounds, an upper portion of the objective 1204, as described elsewhere in the present disclosure. Further, the liquid handling device 1208 includes a liquid delivery system and a liquid return system as described herein. Accordingly, the liquid handling device 1208 is configured to perform various functions described herein, including immersing the lens 1216 (particularly the outer lens surface) in a liquid immersion medium, and removing liquid from the lens 1216 and the surrounding objective tip, and from nearby regions such as the bottom of a sample support.

Similar to the embodiment illustrated in FIGS. 3-5, the structure of the liquid handling device 1208 may include a hollow cone 1209 and an annular cap 1226 cooperatively defining the liquid delivery system and the liquid return system. The cone 1209 includes a (first) conical portion 1292 spaced above the objective tip, and a flange portion 1213 adjoining the conical portion 1292. An annular spacer member 1217 may be interposed between the cap 1226 and the flange portion 1213. These components may be secured together in a stacked arrangement by suitable fasteners such as threaded members (e.g., screws, bolts, etc.). The spacer member 1217 may be composed of, for example, an elastomeric sealing material.

The cone 1209 further includes an annular rim 1225 coaxial with the longitudinal axis L and surrounding the lens 1216. The rim 1225 defines a device opening through which the lens 1216 is exposed. The rim 1225 transitions to the conical portion 1292. In the present embodiment, the rim 1225 has one or more discontinuities in its geometry, such as a liquid delivery notch 1235 and a liquid return notch 1229 as described further below.

As in other embodiments, the liquid handling device 308 may generally include a delivery inlet 1272 (FIG. 13) and a return outlet 1214, which may be embodied as fluidic fittings coupled to internal passages in the structure of the liquid handling device 1208. The delivery inlet 1272 and the return outlet 1214 may be coupled to a fluidic system such as the liquid immersion microscope objective system 200 described above and illustrated in FIG. 2.

The liquid delivery system includes the delivery inlet 1272, a delivery passage, and a delivery outlet 1280 in open communication with the lens 1216. The components of the liquid delivery system cooperatively define a liquid delivery path from the delivery inlet 1272, through the delivery passage, through the delivery outlet 1280, and to the lens 1216. The delivery passage may include one or more conduits (e.g., passages, chambers, etc.) as needed to fluidly interconnect the delivery inlet 1272 and the delivery outlet 1280. In the present embodiment and as illustrated in FIG. 13, the delivery passage includes an annular, conical space 1376 defined between an outside surface of a (second) conical portion 1325 of the objective housing 1212 and an inside surface of the conical portion 1292 of the cone 1209. The conical space 1376 terminates at the delivery outlet 1280. In the present embodiment, the delivery outlet 1280 is an annular opening defined between the rim 1225 and the first housing opening 1220, such that the delivery outlet 1280 coaxially surrounds the first housing opening 1220 and the lens 1216.

Also in the present embodiment, the delivery passage includes the delivery notch 1235, which communicates with the conical space 1376 and is in open communication with the lens 1216. Further, as illustrated in FIG. 14, the delivery passage may include a liquid delivery channel 1437 communicating with the delivery notch 1235. For example, the delivery notch 1235 may correspond to the end of the delivery channel 1437 where the rim 1225 is located. The delivery channel 1437 may be formed in or on the inside surface of the conical portion 1292 of the cone 1209. By this configuration, at least a portion of the delivery passage between the delivery inlet 1272 and the delivery outlet 1280

(i.e., the conical portion 1292) defines a primary flow path 1439 running through the delivery channel 1437 to the delivery notch 1235, and secondary flow paths 1441 through the conical space 1376 to the delivery outlet 1280 (but outside of the delivery channel 1437 and delivery notch 1235). As depicted in FIG. 14, the directions of the secondary flow paths 1441 have circumferential components.

As illustrated in FIG. 13, the delivery passage may further include an internal conduit 1329 formed in the cone 1209. The internal conduit 1329 extends from another conduit or chamber 1333 (e.g., formed in the cone 1209) communicating with the delivery inlet 1272, to an opening in a wall 1337 of the cone 309, which opening in turn communicates with the conical space 376. As shown in FIG. 14, this opening may correspond to the end of the delivery channel 1437 opposite to the delivery notch 1235.

The liquid path defined by the liquid delivery system may also be utilized as a liquid aspiration (removal) path, as described above in conjunction with FIG. 2.

The liquid return system includes a return inlet 1206 communicating with the lens 1216 via the conical portion 1292, a return passage, and the return outlet 1214. Also in the present embodiment, the delivery passage includes the return notch 1229, which is in open communication with the lens 1216. As illustrated in FIG. 12, the liquid return system may further include a liquid return channel 1231 (or spillway) running from the return notch 1229 to the return inlet 1206. For example, the return notch 1229 may correspond to the start of the return channel 1231 where the rim 1225 is located. The return channel 1231 may be formed in or on the outside surface of the conical portion 1292 of the cone 1209. Accordingly, in the present embodiment, the components of the liquid return system cooperatively define a liquid return path from the lens 1216, into and through the return notch 1229, along or through the return channel 1231, through the return inlet 1206, through the return passage, and to the return outlet 1214. The return notch 1229 and the return channel 1231 may function and provide advantages as described above in conjunction with the embodiment illustrated in FIGS. 6 and 7. In the present embodiment, however, the dimensions (in particular, the width) of the return channel 1231 may be constant along its length. For example, the width of the return channel 1231 may remain the same (or substantially the same) as the width of the return notch 1229 along the length of the return channel 1231.

As illustrated in FIG. 12, the liquid return system may further include a basin (or bucket) 1233 surrounding the return inlet 1206. In such embodiment, the conical portion 1292 defines a primary flow path 1439 running from the return notch 1229, through the return channel 1231, and into the return inlet 1206. The basin 1233 may collect secondary flows along the conical portion 1292 outside of the return inlet 1206.

As evident from the foregoing description, the present disclosure provides a microscope objective assembly (and related system and method) in one or more embodiments that implements liquid immersion of an objective lens in a highly effective manner. The objective assembly is also highly effective in controlling both the supply of immersion liquid to the objective lens and surrounding objective tip, and the removal of immersion liquid from the objective lens and surrounding objective tip. In addition to creating and maintaining a liquid bolus under controlled conditions in the gap between the objective lens and underside of a microplate or other sample support, the objective assembly is capable of removing immersion liquid from and drying both the objective tip and the underside of a sample support such as a microplate, both on demand and in response to detected conditions. Moreover, the objective assembly is capable of preventing leakage of immersion liquid from the objective tip onto sensitive components of the microscope in which the objective assembly operates. Further, the objective assembly is readily adapted for implementation in an automated microscope. The function and operation of the objective assembly may be automated, and thus may be readily integrated into the programmed method development for a given automated microscope and sample analysis performed by such microscope. For example, the objective assembly is capable of supporting high-speed and high-throughput imaging of multiple samples, including long-term measurements of samples taking hours or days, without the need for user intervention.

It will be understood that terms such as "communicate" and "in . . . communication with" (for example, a first component "communicates with" or "is in communication with" a second component) are used herein to indicate a structural, functional, mechanical, electrical, signal, optical, magnetic, electromagnetic, ionic or fluidic relationship between two or more components or elements. As such, the fact that one component is said to communicate with a second component is not intended to exclude the possibility that additional components may be present between, and/or operatively associated or engaged with, the first and second components.

It will be understood that various aspects or details of the invention may be changed without departing from the scope of the invention. Furthermore, the foregoing description is for the purpose of illustration only, and not for the purpose of limitation—the invention being defined by the claims.

What is claimed is:

1. An objective assembly, comprising:
an objective comprising a housing and a lens mounted at the housing, the lens comprising an outer lens surface; and
a liquid handling device mounted at the objective and configured to immerse the outer lens surface in a liquid, the liquid handling device comprising:
a rim surrounding the outer lens surface and defining a device opening through which the lens is exposed, the rim comprising a notch;
a conical portion comprising a conical surface communicating with the notch;
a delivery outlet communicating with the device opening; and
a return inlet communicating with the conical surface, wherein:
the notch is formed to one side of the lens through which the liquid from the lens is drawn thereinto and by which the liquid is directed downward in direct contact with the notch and the conical surface to the return inlet;
the liquid handling device defines a liquid delivery path from the delivery outlet to the device opening; and
the liquid handling device defines a liquid return path from the device opening, through the notch, along the conical surface, and to the return inlet.

2. The objective assembly of claim 1, wherein the delivery outlet surrounds the lens, and wherein the housing comprises a housing opening through which the lens is exposed, the device opening surrounds the housing opening, and the delivery outlet is an annular space defined between the housing opening and the lens opening.

3. The objective assembly of claim 1, wherein the liquid handling device comprises a delivery passage communicating with the delivery outlet, and wherein the delivery passage comprises an annular conical space.

4. The objective assembly of claim 3, wherein the conical portion of the liquid handling device is a first conical portion, the objective comprises a second conical portion, and the annular conical space is defined between the first conical portion and the second conical portion.

5. The objective assembly of claim 1, wherein the liquid handling device comprises a return channel running from the notch toward the return inlet.

6. The objective assembly of claim 5, wherein the return channel is disposed on the conical surface.

7. The objective assembly of claim 6, wherein the conical surface is an outside surface external to the conical portion.

8. The objective assembly of claim 6, wherein the conical surface is an inside surface internal to the conical portion.

9. The objective assembly of claim 5, wherein the return channel has a length between the notch and the return inlet, and a width transverse to the length, and the width increases along the return channel in a direction away from the notch.

10. The objective assembly of claim 5, wherein the liquid handling device comprises a basin communicating with the return inlet, and the return channel runs from the notch toward the basin.

11. The objective assembly of claim 1, wherein the delivery outlet comprises a port, and the port and the notch are located at different angular positions relative to a center of the lens.

12. The objective assembly of claim 1, wherein the notch of the liquid return path is a return notch, the rim further comprises a delivery notch, and the liquid delivery path comprises a primary flow path through the delivery notch to the device opening and a secondary flow path through the delivery outlet to the device opening.

13. The objective assembly of claim 1, comprising a liquid leak sensor disposed on the liquid handling device.

14. The objective assembly of claim 13, wherein the liquid leak sensor is disposed at a part of the liquid handling device located at a greater radial distance from the longitudinal axis than the conical surface.

15. The objective assembly of claim 13, wherein the liquid handling device comprises an outer side, and the liquid leak sensor comprises an electrode disposed on the outer side.

16. A method for immersing a lens of a microscope objective with a liquid, the method comprising:
positioning the microscope objective below a sample support such that the lens and the sample support are separated by a gap, wherein the lens is surrounded by a rim defining an opening through which the lens is exposed, and the rim comprises a notch and a conical portion having a conical surface communicating with the notch;
flowing liquid to the lens to form and maintain a liquid bolus in the gap and in contact with the lens and the sample support; and
while maintaining the liquid bolus, removing liquid by flowing liquid from the lens into the notch formed to one side of the lens through which the liquid from the lens is drawn thereinto and by which the liquid is directed downward in direct contact with the notch and the conical surface to a return inlet communicating with the conical surface.

17. The method of claim 16, wherein the sample support comprises a first sample container and a second sample container, and the liquid bolus is in contact with the first sample container, and further comprising:
moving at least one of the lens or the sample support relative to the other, to position the lens below the second sample container; and
while moving, continuing to flow liquid or maintain liquid to keep the lens wet.

18. The method of claim 17, wherein flowing liquid to the lens to form and maintain the liquid bolus is done at a first flow rate, and further comprising:
before or while moving, adjusting the flowing of the liquid to a second flow rate less than the first flow rate.

19. The method of claim 17, wherein the liquid bolus in contact with the first sample container is a first liquid bolus, and further comprising:
after moving, forming a second liquid bolus in contact with the lens and the second sample container.

20. The method of claim 16, wherein the conical surface is part of a liquid handling device, and further comprising operating a liquid leak sensor to determine whether liquid is present on a portion of the liquid handling device located at a greater radial distance from the lens than the conical surface.

21. An objective assembly, comprising:
an objective comprising a housing and a lens mounted at the housing, the lens comprising an outer lens surface; and
a liquid handling device mounted at the objective and configured to immerse the outer lens surface in a liquid, the liquid handling device comprising:
a rim surrounding the outer lens surface and defining a device opening through which the lens is exposed;
a conical portion comprising a conical surface;
a delivery outlet communicating with the device opening;
a return inlet communicating with the conical surface; and
an annular V-shaped channel communicating with the return inlet via an annular opening at a lower vertex of the annular V-shaped channel,
wherein:
the liquid handling device defines a liquid delivery path from the delivery outlet to the device opening; and
the liquid handling device defines a liquid return path from the device opening, along the conical surface, through the annular V-shaped channel, and to the return inlet.

22. The objective assembly of claim 21, wherein the housing comprises a housing opening through which the lens is exposed, the device opening surrounds the housing opening, and the delivery outlet is an annular space defined between the housing opening and the lens opening.

* * * * *